US009174682B2

(12) United States Patent
Schmitz et al.

(10) Patent No.: US 9,174,682 B2
(45) Date of Patent: Nov. 3, 2015

(54) ENGINE HOOD ARRANGEMENT

(75) Inventors: Andreas Schmitz, Helfenbrunn (DE);
Gerd Thilo, Marktoberdorf (DE)

(73) Assignee: AGCO International GmbH,
Neuhausen (CH)

( * ) Notice: Subject to any disclaimer, the term of this patent is extended or adjusted under 35 U.S.C. 154(b) by 76 days.

(21) Appl. No.: 14/004,495

(22) PCT Filed: Mar. 8, 2012

(86) PCT No.: PCT/EP2012/054027
§ 371 (c)(1),
(2), (4) Date: Nov. 21, 2013

(87) PCT Pub. No.: WO2012/123332
PCT Pub. Date: Sep. 20, 2012

(65) Prior Publication Data
US 2014/0070569 A1   Mar. 13, 2014

(30) Foreign Application Priority Data
Mar. 11, 2011 (GB) .................................. 1104158.9

(51) Int. Cl.
| *B62D 25/10* | (2006.01) |
| *B62D 25/12* | (2006.01) |
| *B60J 10/00* | (2006.01) |
| *B23K 26/20* | (2014.01) |
| *B60J 10/08* | (2006.01) |

(52) U.S. Cl.
CPC ................ *B62D 25/10* (2013.01); *B23K 26/20* (2013.01); *B60J 10/0014* (2013.01); *B62D 25/12* (2013.01); *B60J 10/08* (2013.01)

(58) Field of Classification Search
CPC ..... B62D 25/10; B62D 12/082; B62D 12/085
USPC .......... 296/76, 193.11; 180/68.1, 69.2, 69.21, 180/900
See application file for complete search history.

(56) References Cited

U.S. PATENT DOCUMENTS

| 5,215,157 A * | 6/1993 | Teich .......................... 180/69.24 |
| 5,535,846 A * | 7/1996 | Kurtz et al. ................. 180/69.21 |
| 2003/0057005 A1 | 3/2003 | Nagai et al. |

(Continued)

FOREIGN PATENT DOCUMENTS

| CA | 2317241 A1 * | 5/2001 |
| DE | 3132315 C1 | 1/1983 |

(Continued)

OTHER PUBLICATIONS

International Search Report for International Application No. PCT/EP2012/054027 Dated Dec. 13, 2012.

(Continued)

*Primary Examiner* — Jason S Daniels

(57) ABSTRACT

An engine hood and a method of making a hood for a tractor or similar vehicle, the hood being of generally inverted U-shaped configuration with an upper top portion and downwardly extending side portions. The hood is hinged adjacent one end for upward pivoting between a closed position in which an associated engine is covered and an open position which provides access to the engine. The hood has an outer skin and inner reinforcing members secured to the inside of the outer skin to form two beam-like structures which extend away from the hinge towards the other end of the hood to stiffen the hood against twisting.

41 Claims, 43 Drawing Sheets

(56) References Cited

U.S. PATENT DOCUMENTS

| | | | |
|---|---|---|---|
| 2004/0216934 A1* | 11/2004 | Tomiyama et al. | 180/68.1 |
| 2006/0005471 A1 | 1/2006 | Yamada et al. | |
| 2008/0006460 A1* | 1/2008 | Giovannini et al. | 180/69.2 |
| 2010/0089674 A1 | 4/2010 | Oka | |
| 2010/0187861 A1* | 7/2010 | Schmitz | 296/191 |
| 2011/0036047 A1* | 2/2011 | Uto et al. | 52/784.1 |

FOREIGN PATENT DOCUMENTS

| | | | |
|---|---|---|---|
| DE | 10127714 A1 | 1/2002 | |
| DE | 10347635 A1 | 7/2006 | |
| DE | 102005041128 A1 | 3/2007 | |
| EP | 0317745 A1 | 5/1989 | |
| EP | 0950603 A2 | 10/1999 | |
| EP | 1714857 A1 | 10/2006 | |
| EP | 2213493 A2 | 8/2010 | |
| FR | 1150126 A | 1/1958 | |
| FR | 2590618 A1 | 5/1987 | |
| FR | 2933665 A1 | 1/2010 | |
| FR | 2943280 A1 | 9/2010 | |
| GB | 2047634 A | 12/1980 | |
| GB | 2268130 A | 1/1994 | |
| GB | 2403695 A | 1/2005 | |
| GB | 2419371 A | 4/2006 | |
| JP | 58218450 A | 12/1983 | |
| JP | 02128967 A | * | 5/1990 |
| JP | 07096865 A | 10/1993 | |
| JP | 2011025576 A | 7/2009 | |
| JP | 2011111106 A | 11/2009 | |
| WO | 2004101315 A2 | 11/2004 | |

OTHER PUBLICATIONS

GB Search Report for GB Application No. 1104158.9 Dated Mar. 6, 2012.

\* cited by examiner

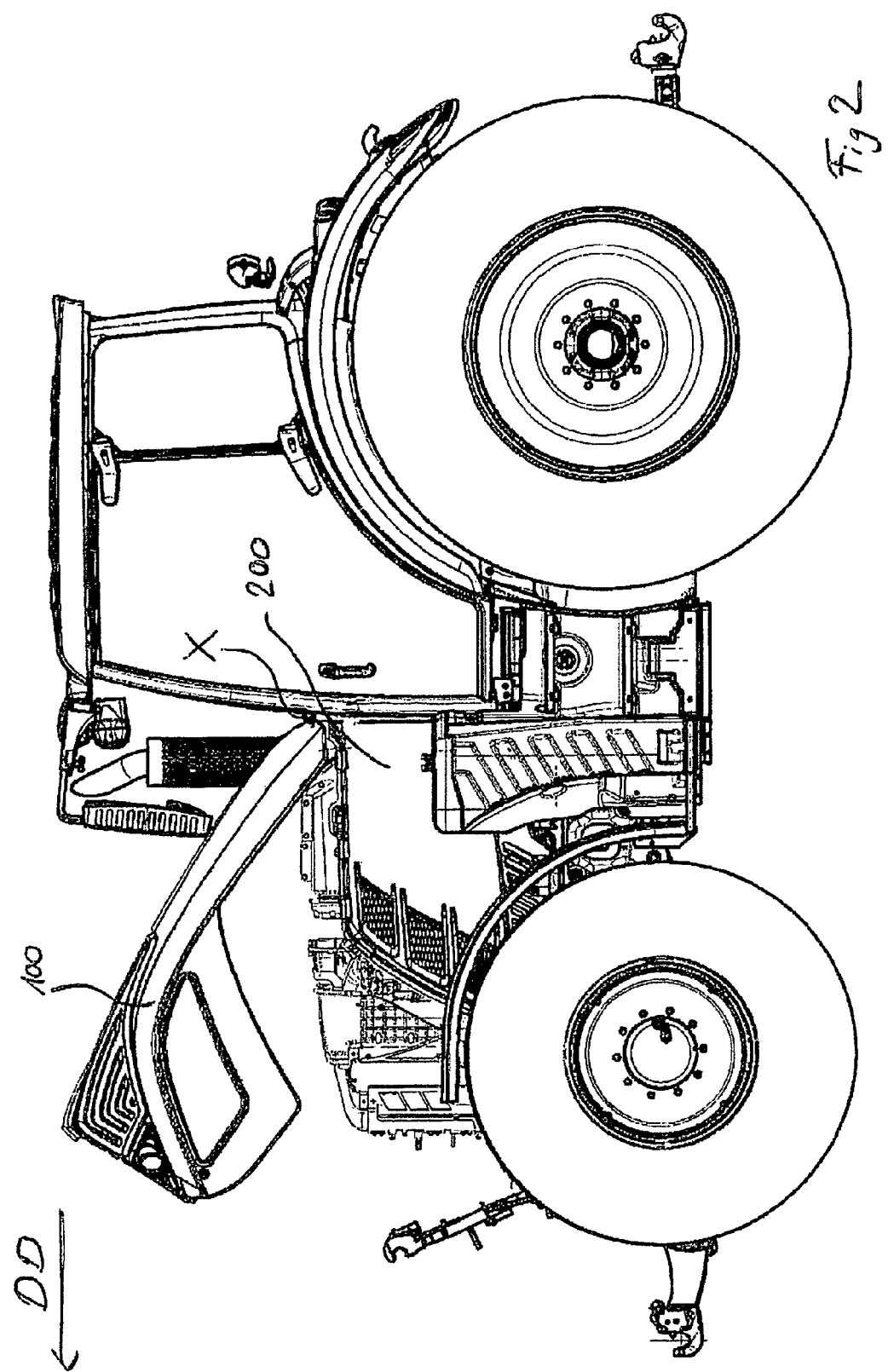

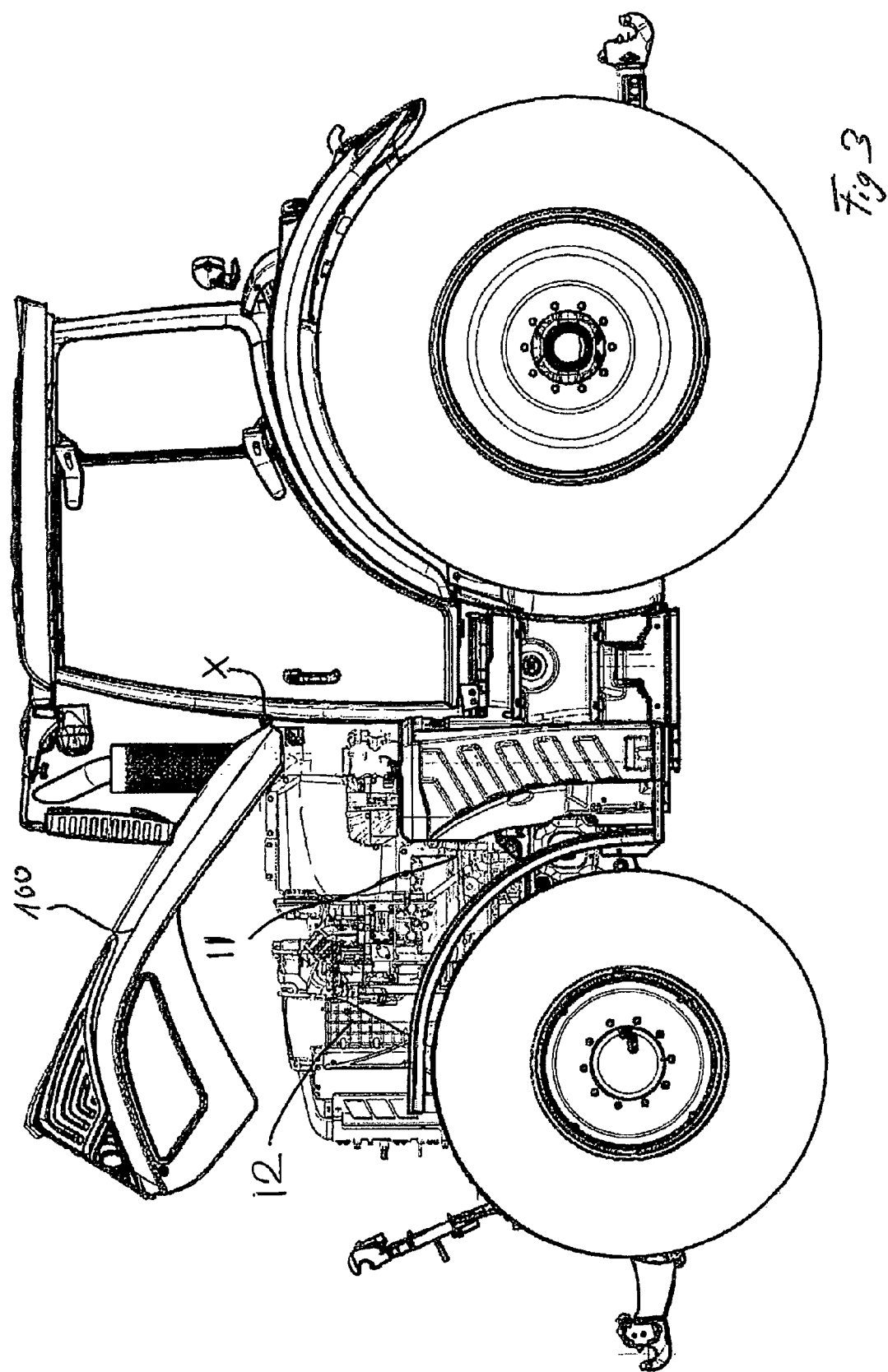

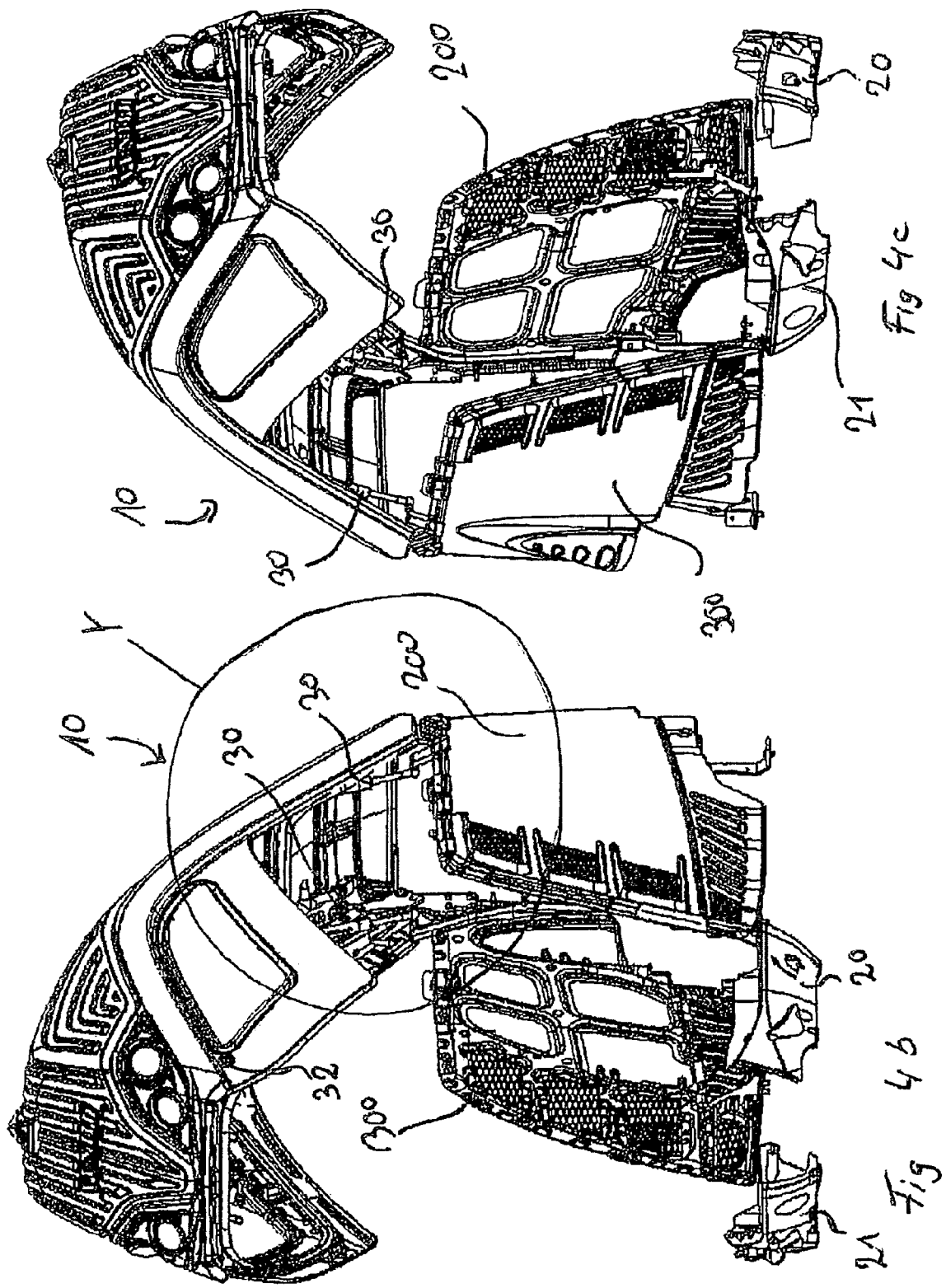

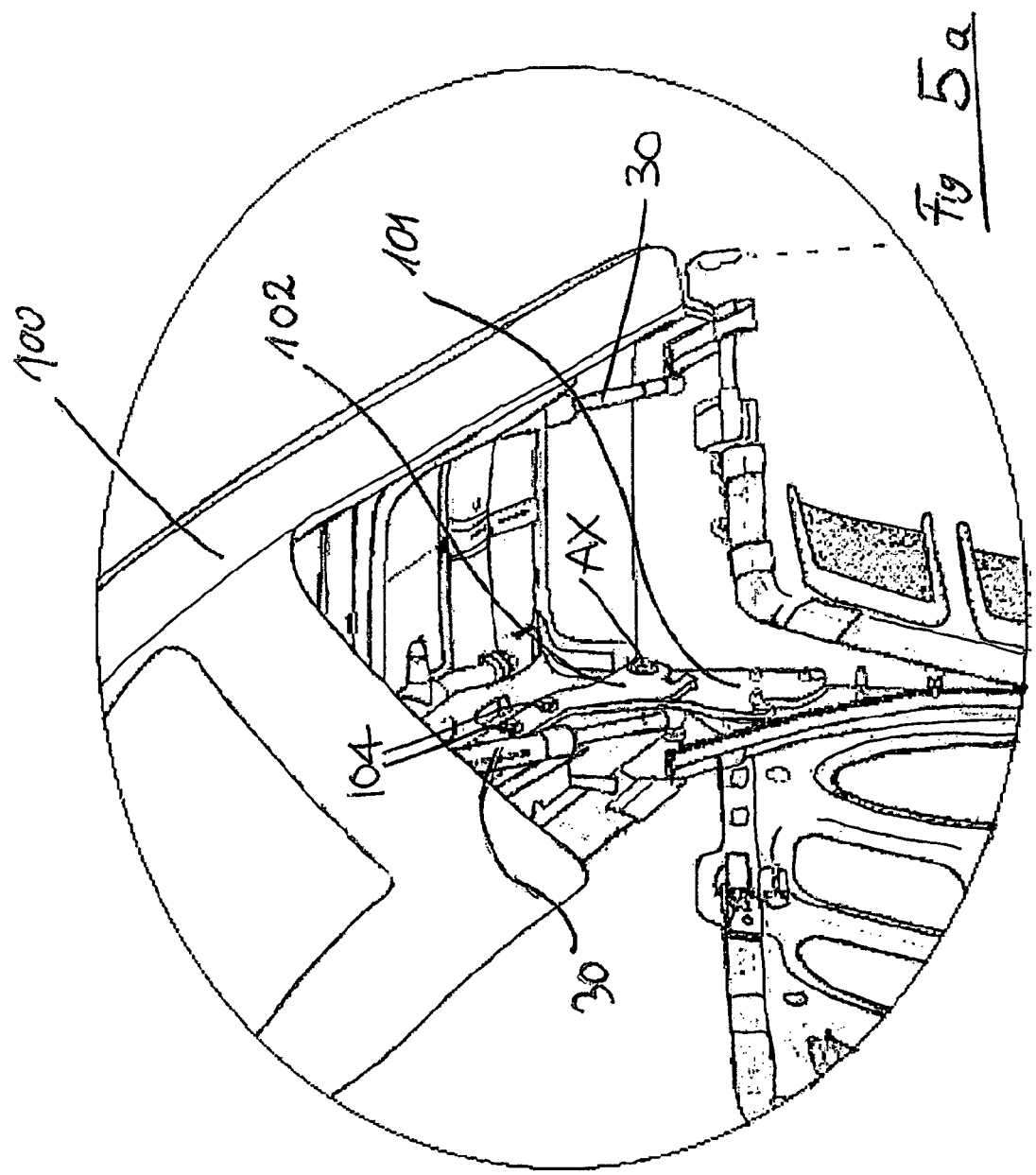

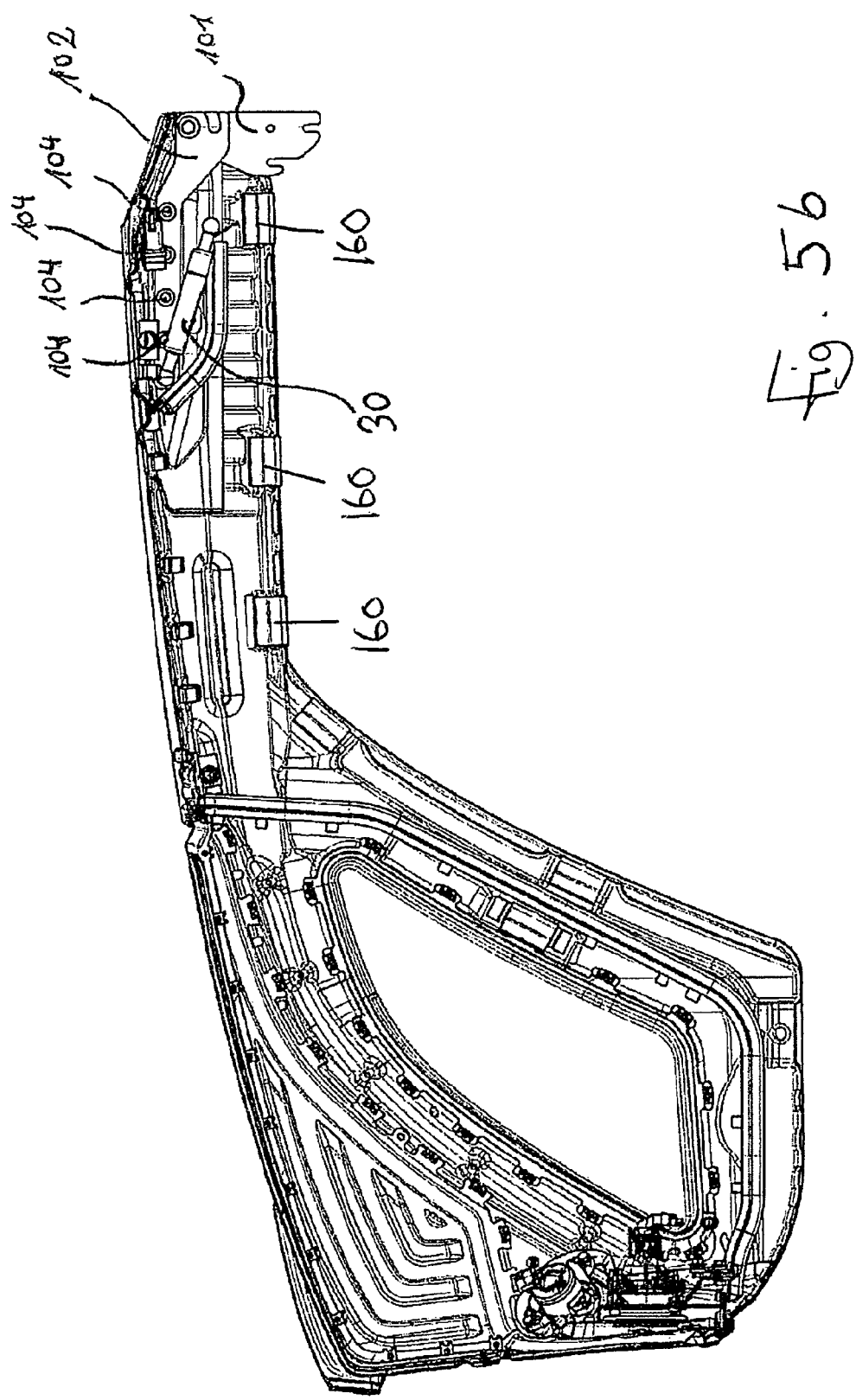

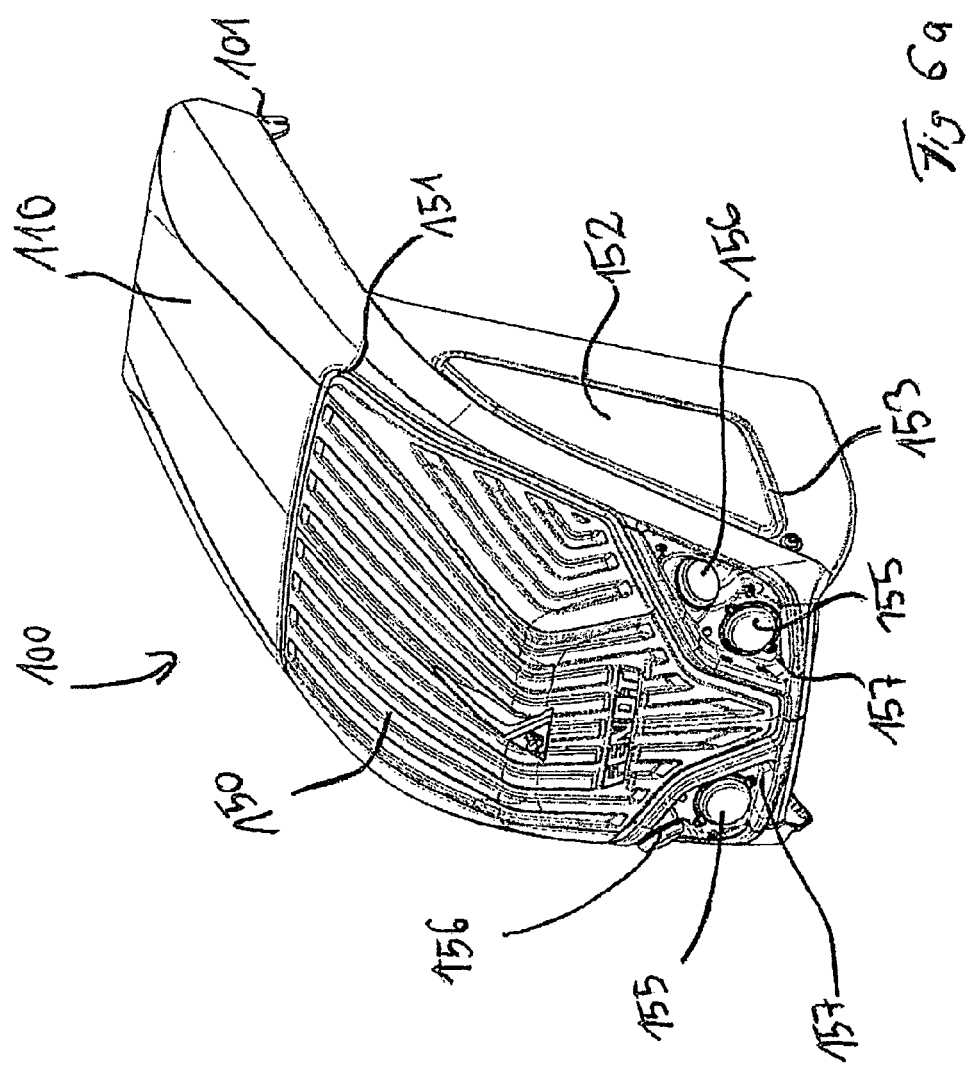

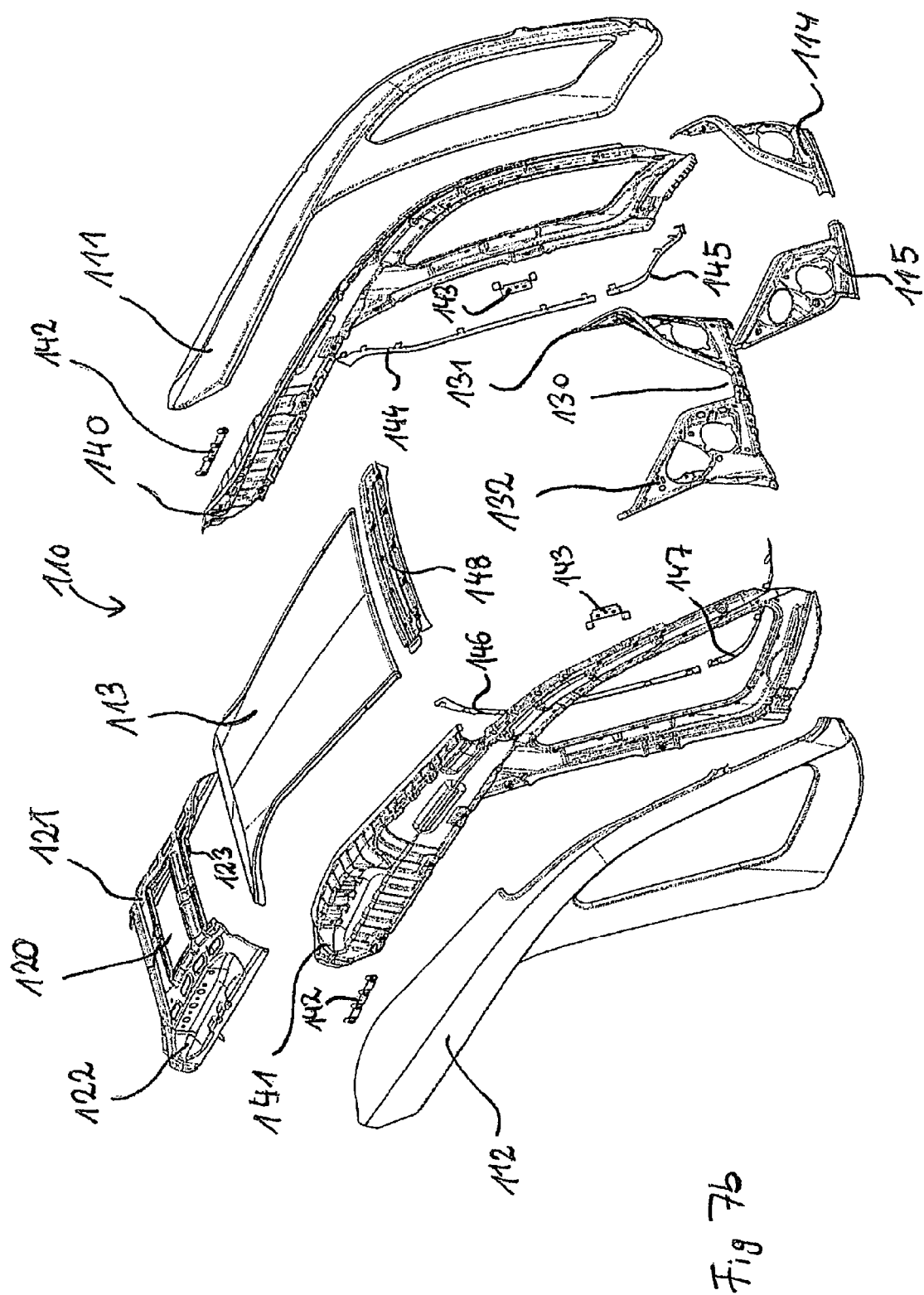

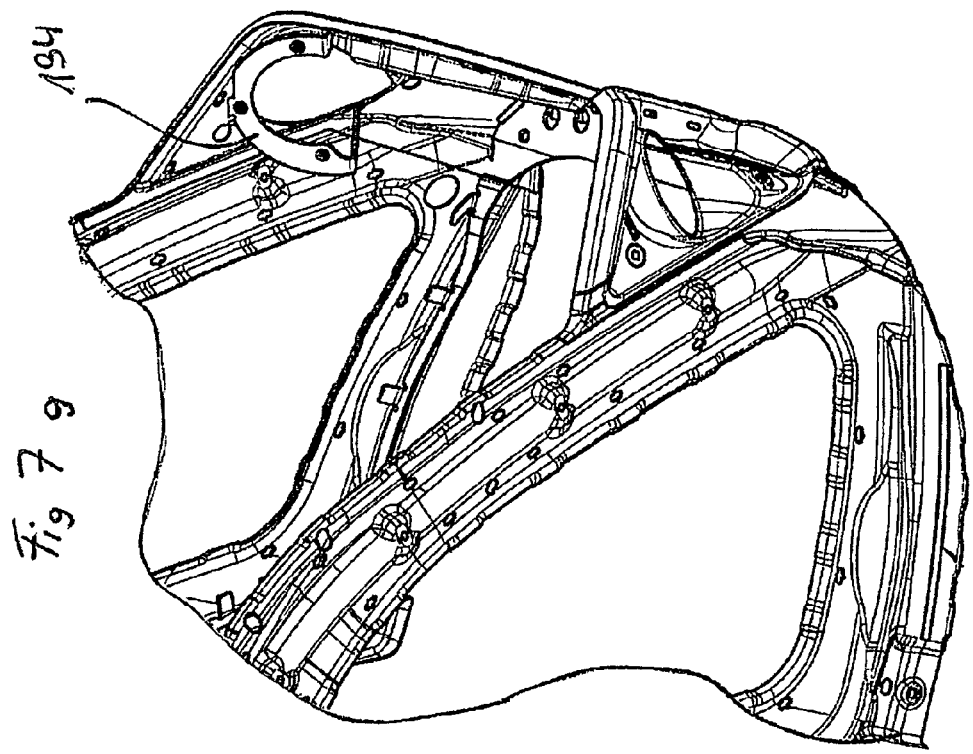
Fig 7g
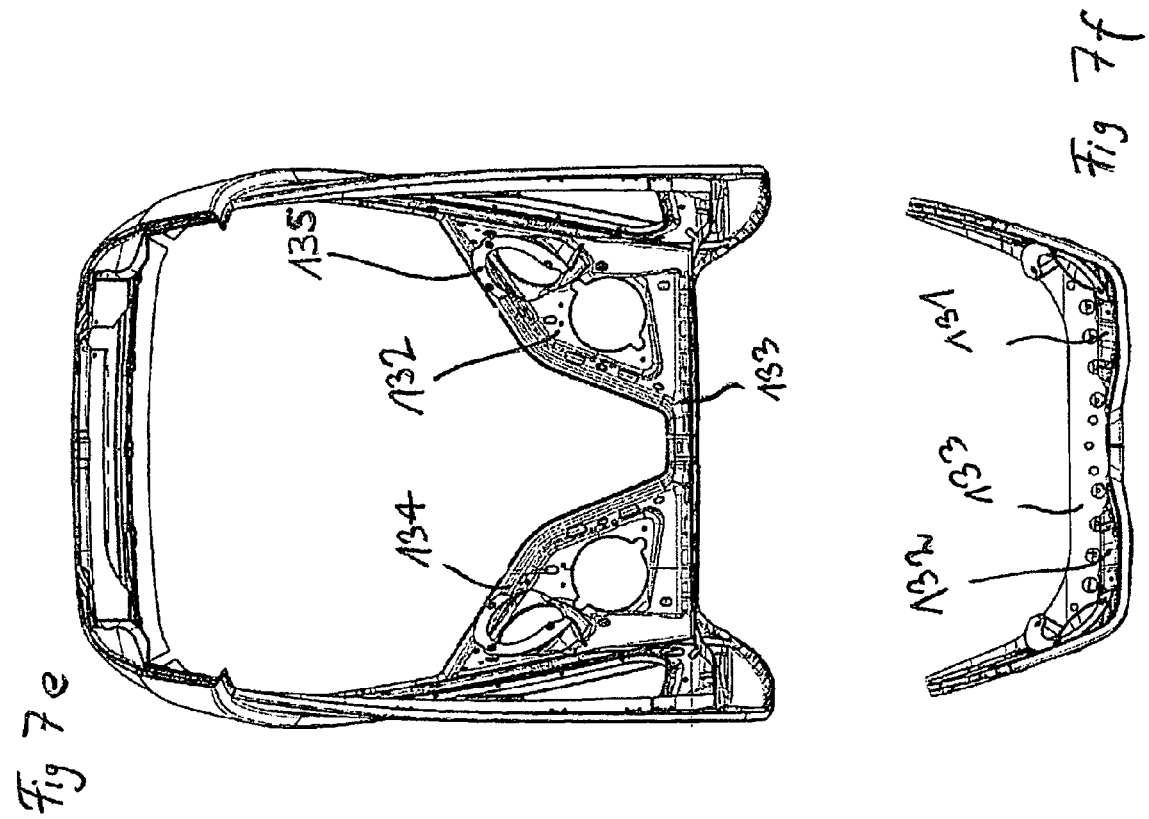
Fig 7e
Fig 7f

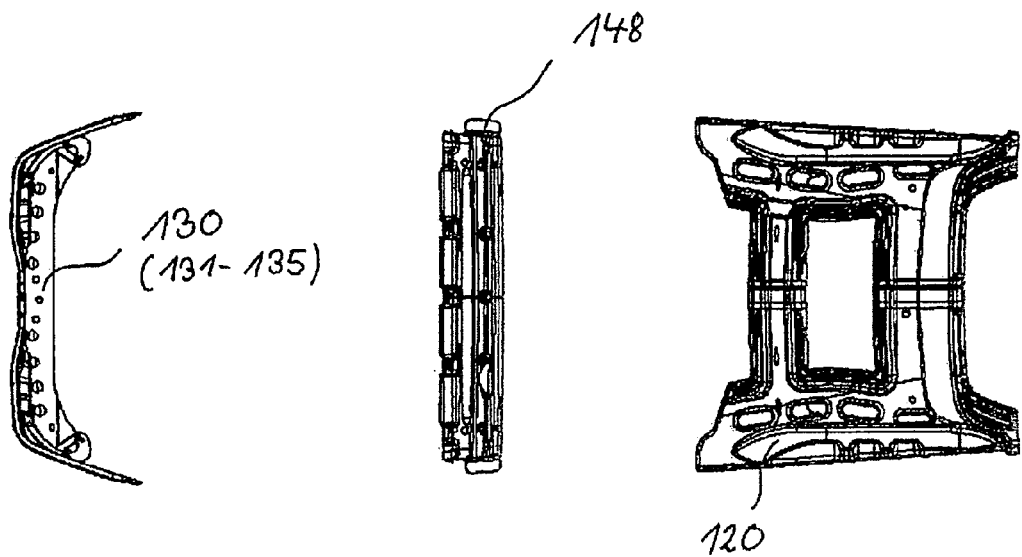
Fig 8a
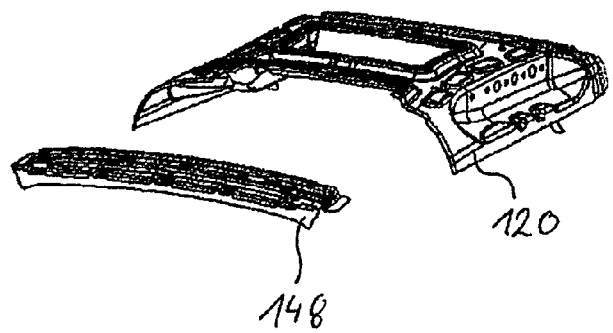
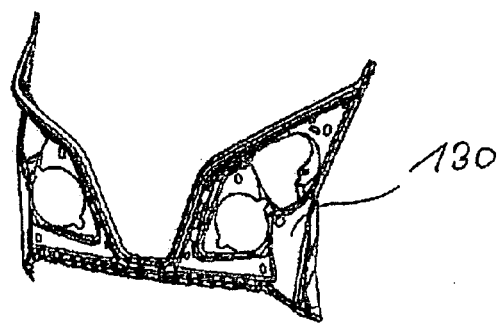

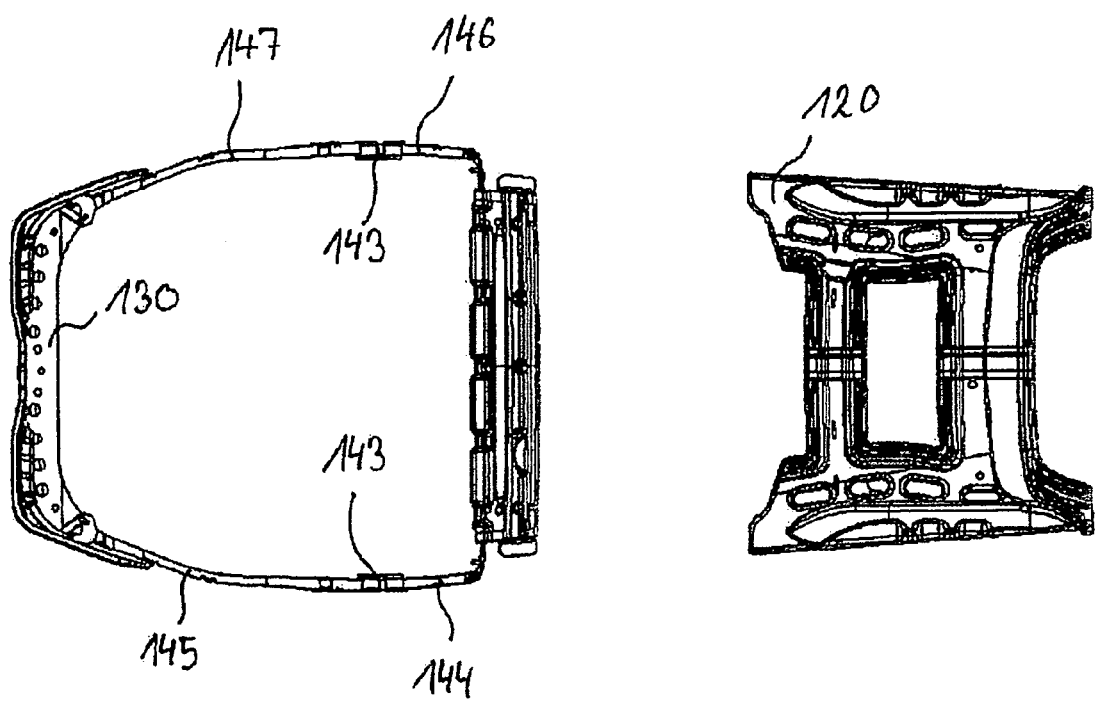
Fig 8b
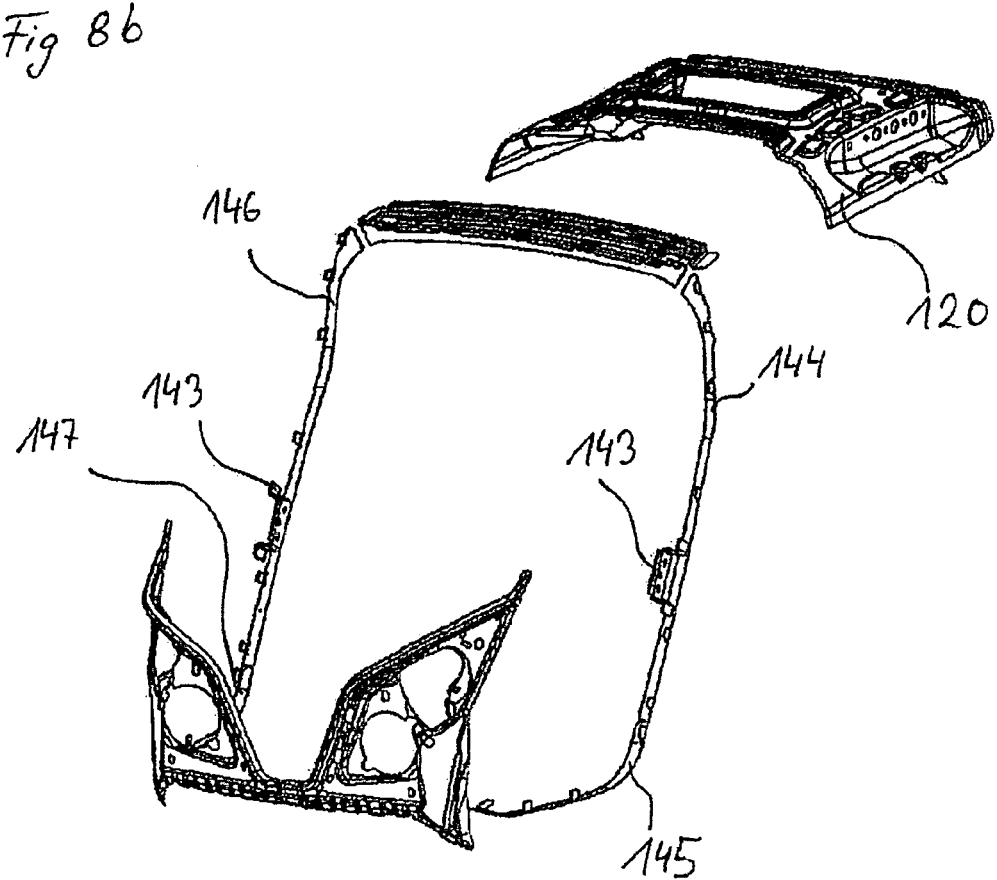

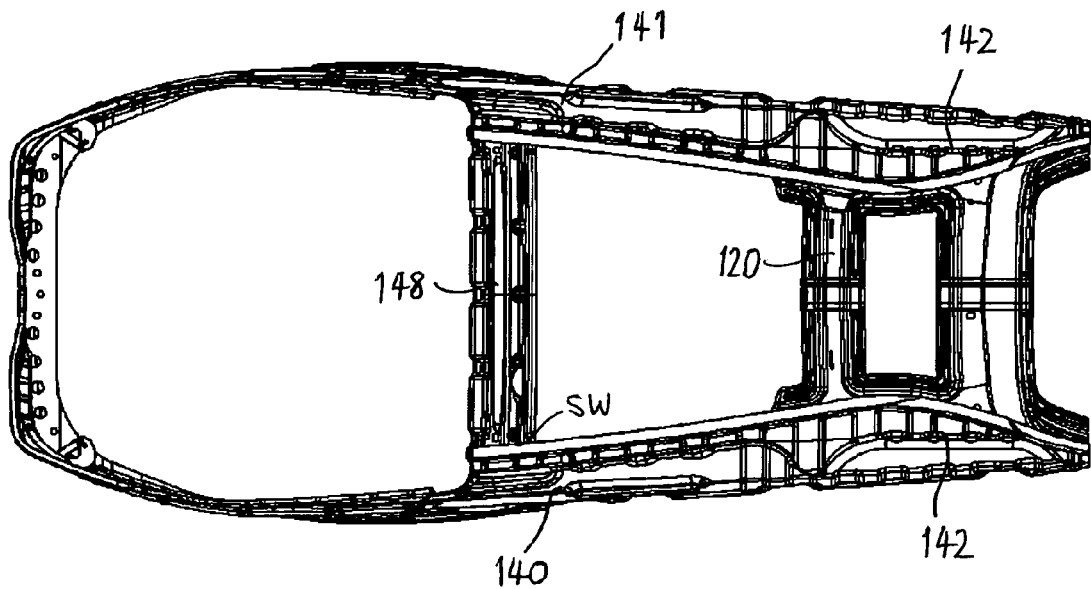
Fig 8c
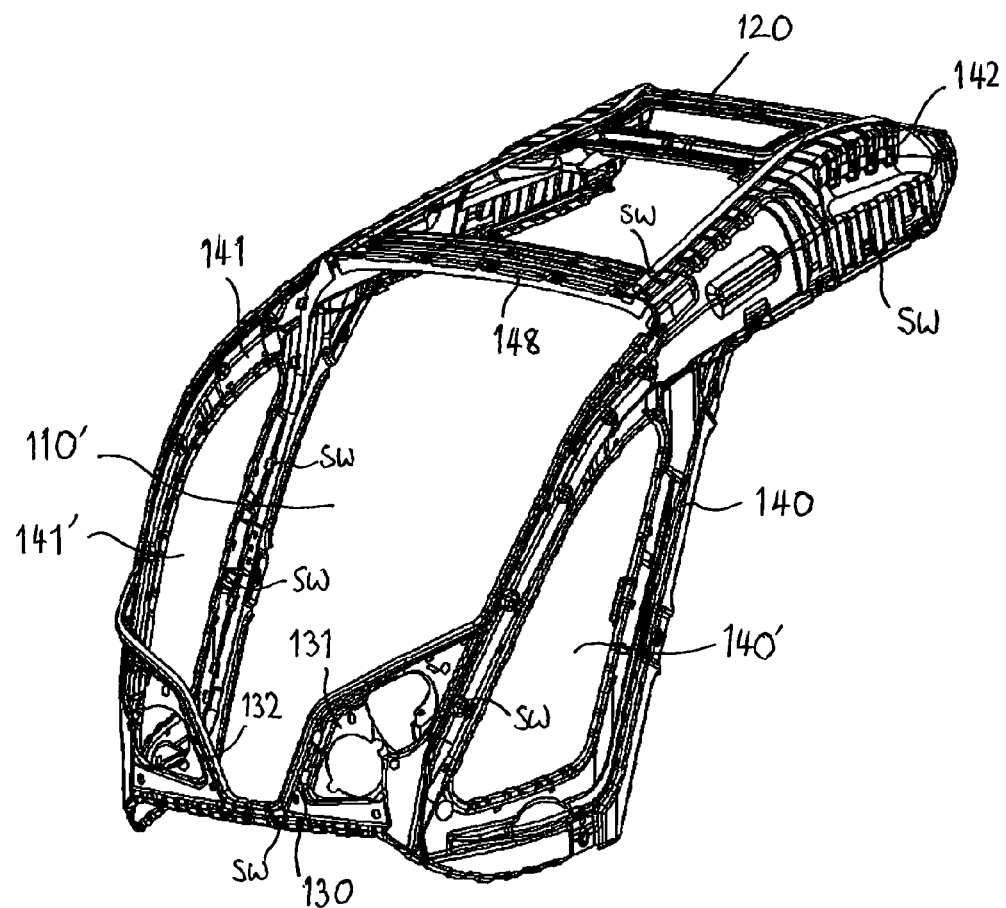

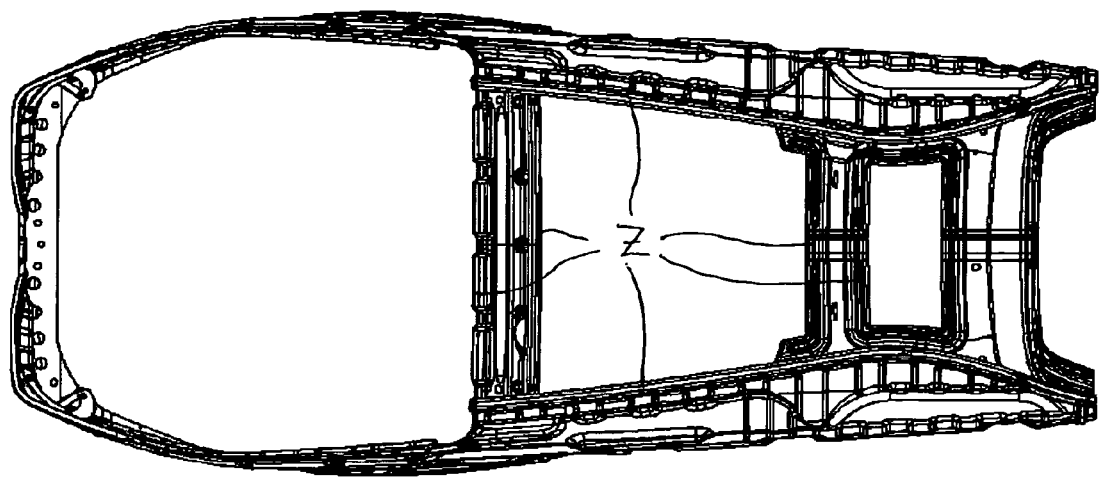
Fig 8d
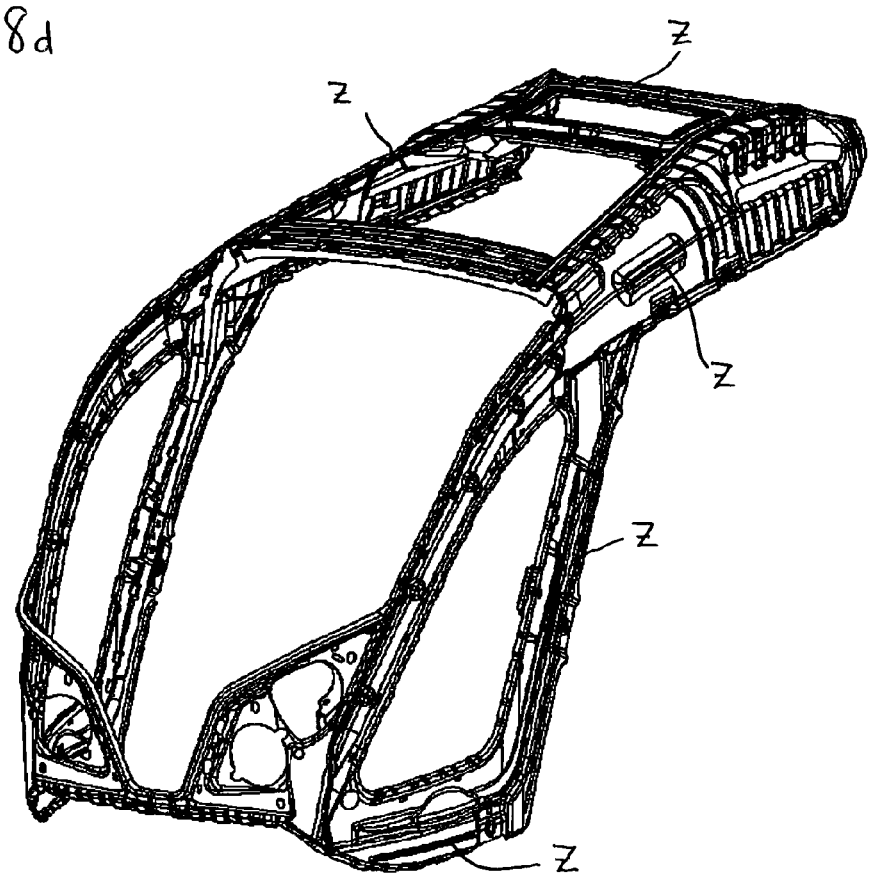

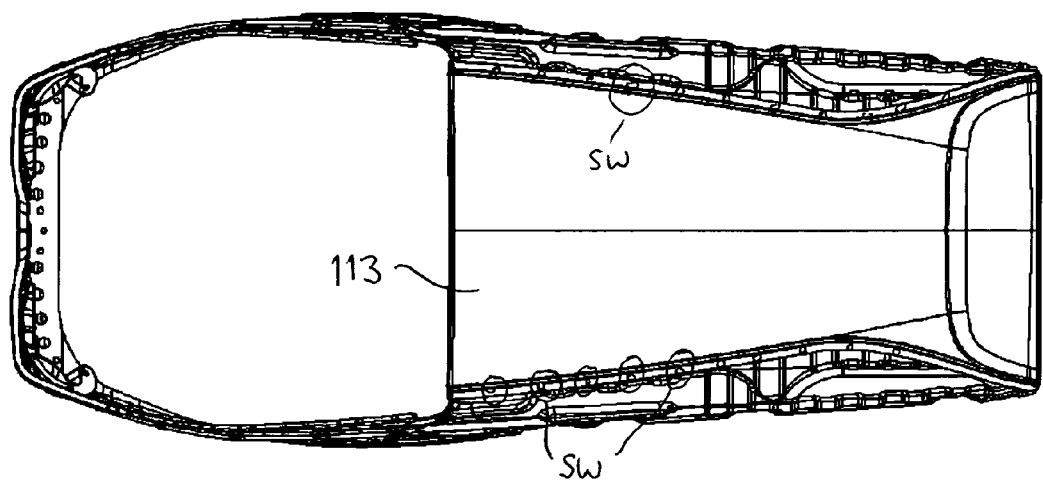
Fig 8e
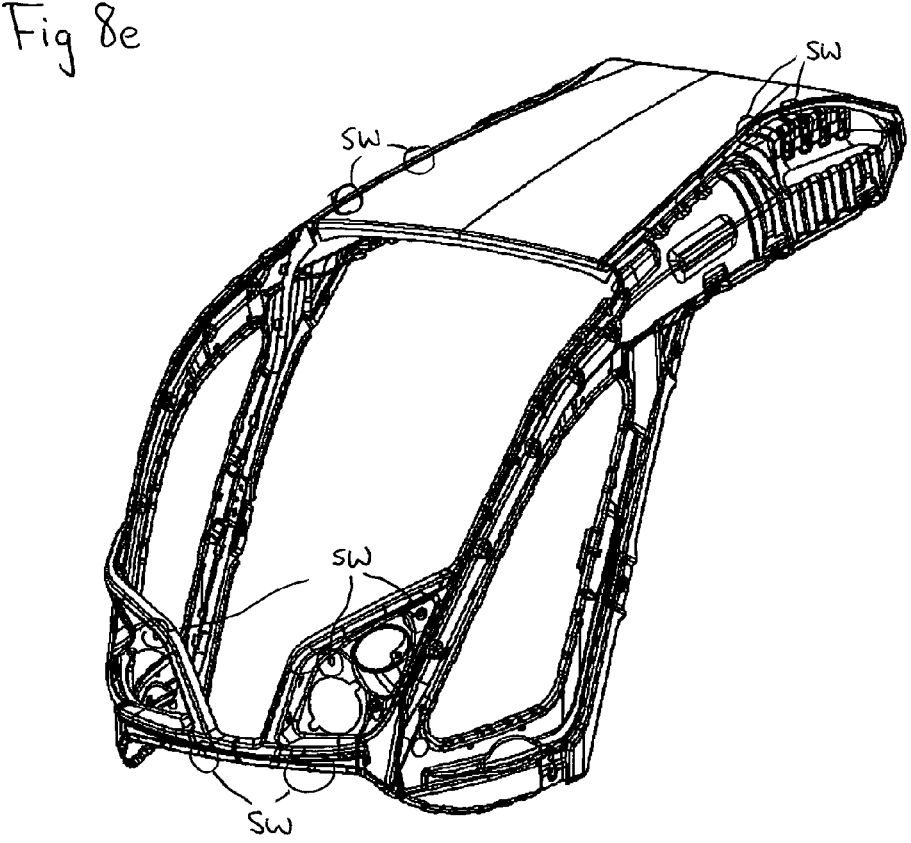

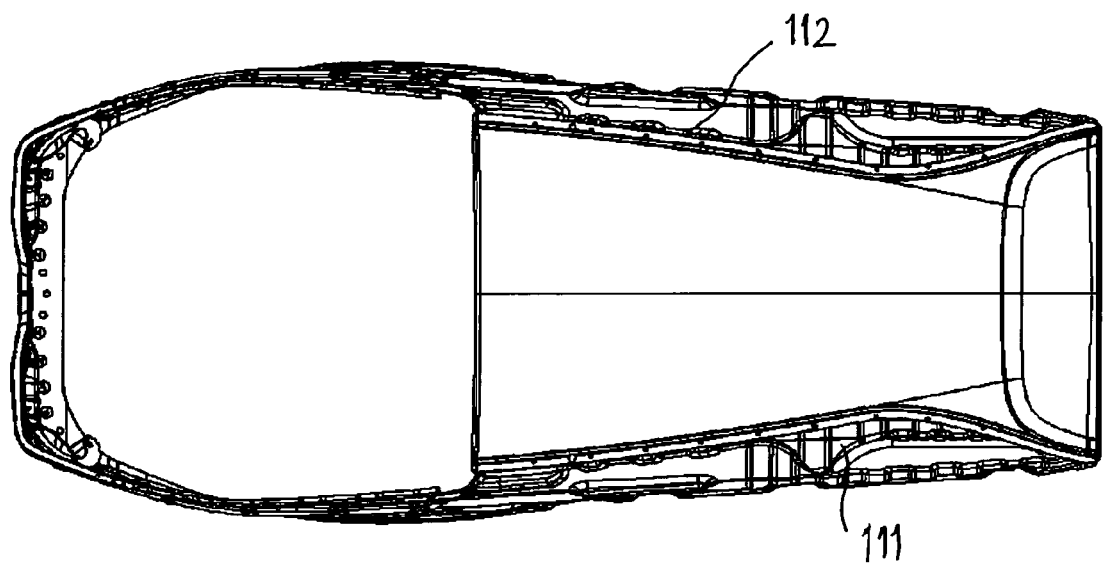
Fig 8f
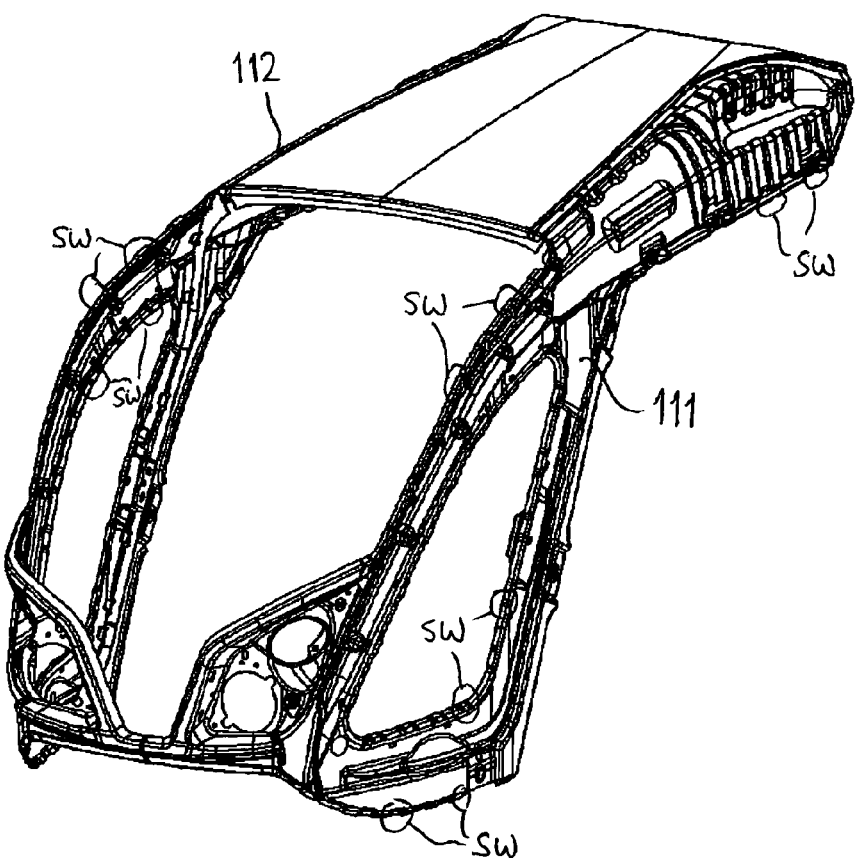

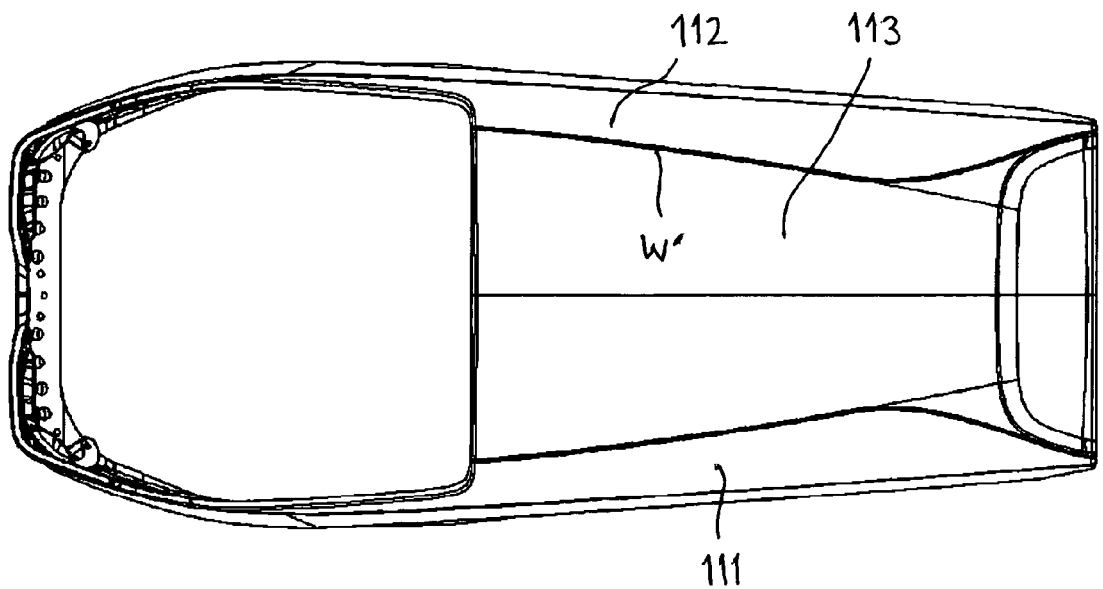
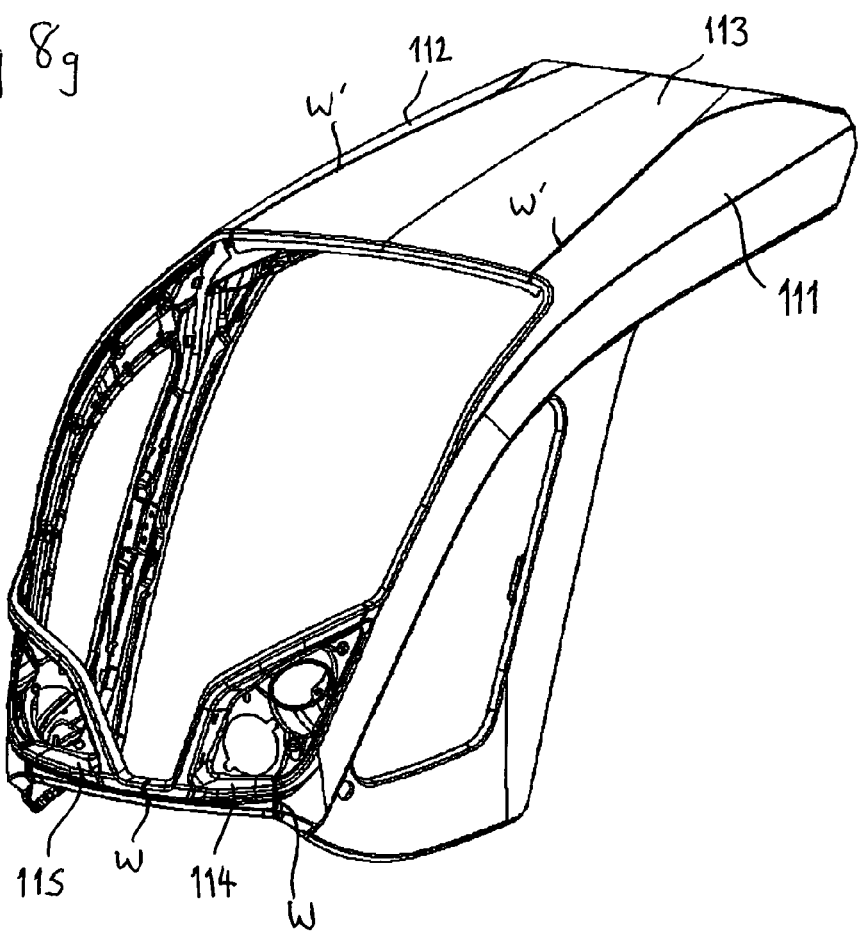
Fig 8g

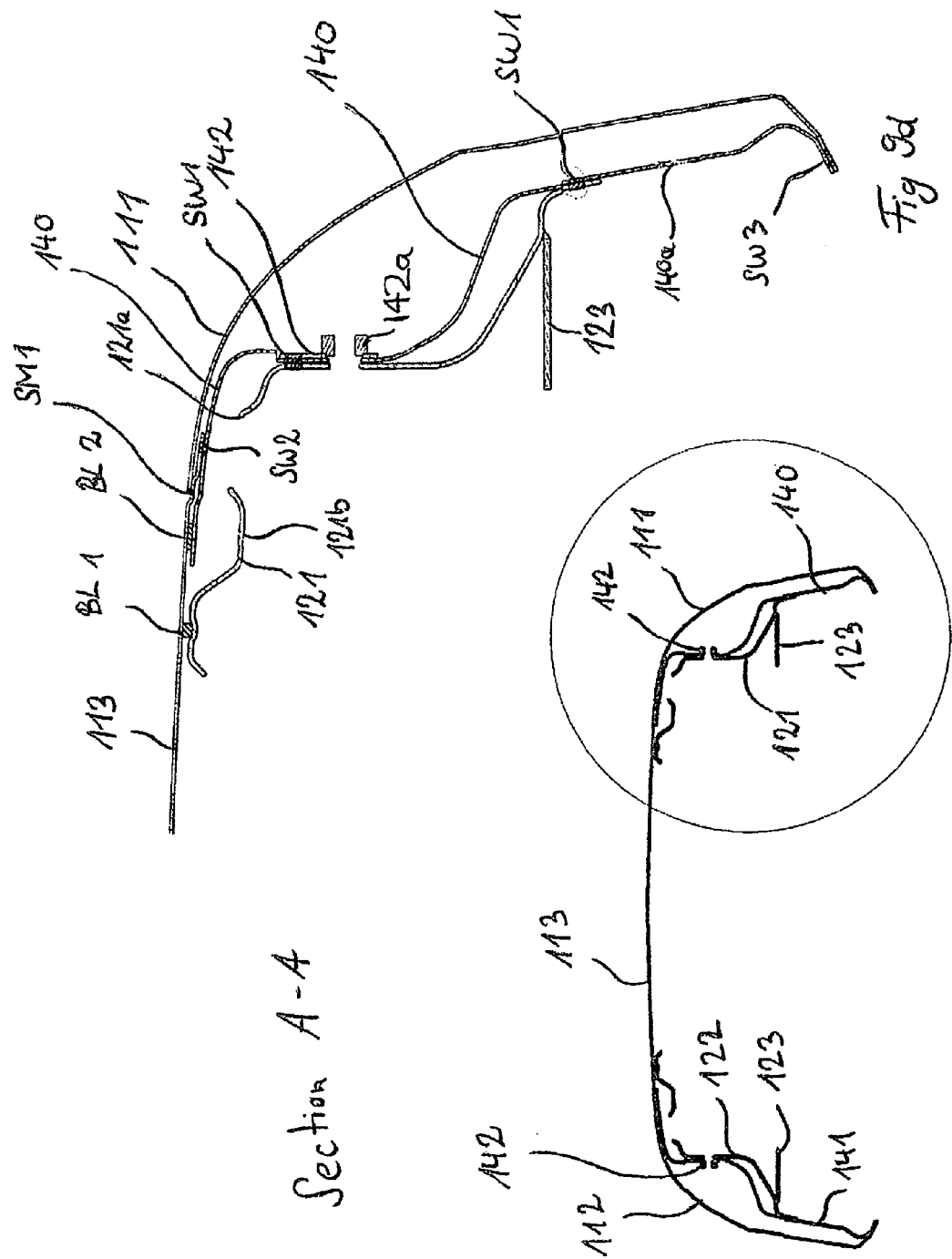

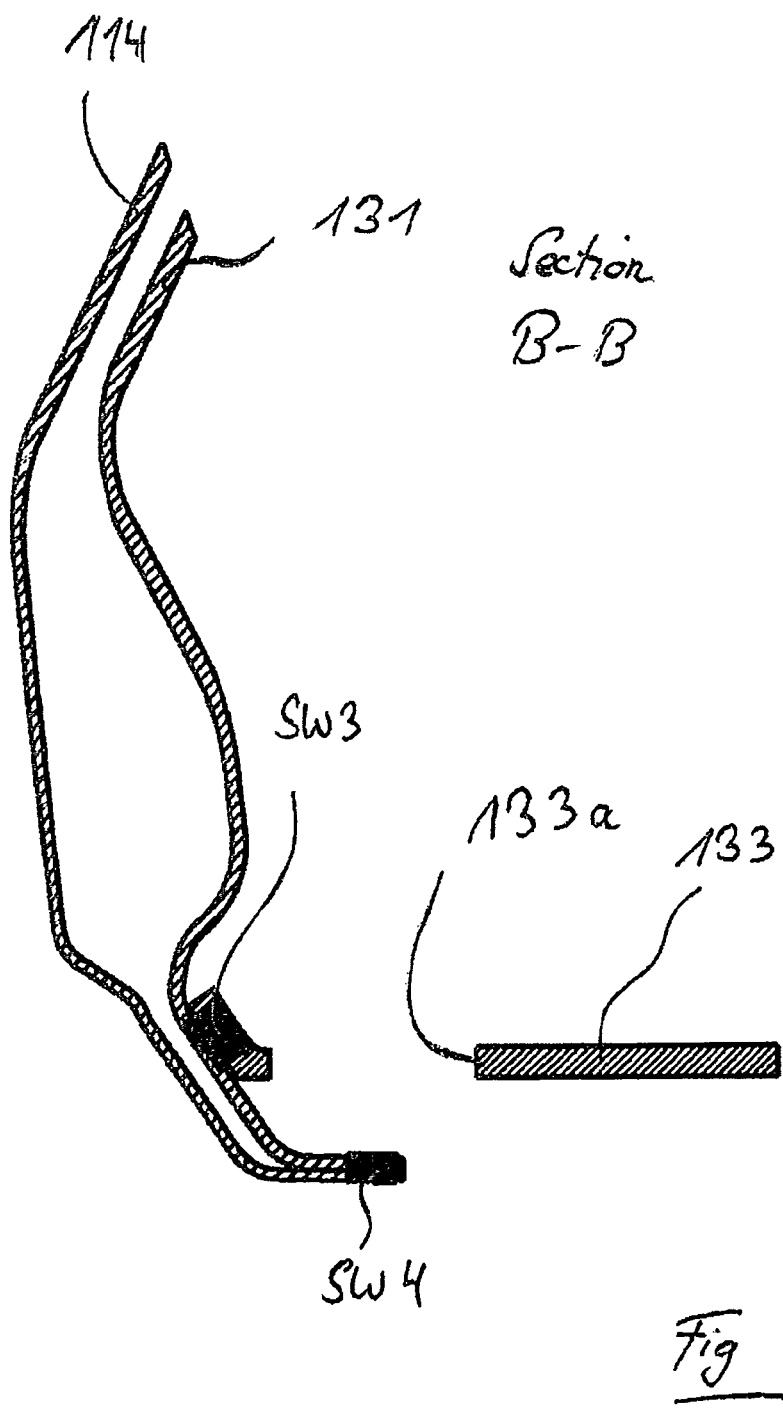

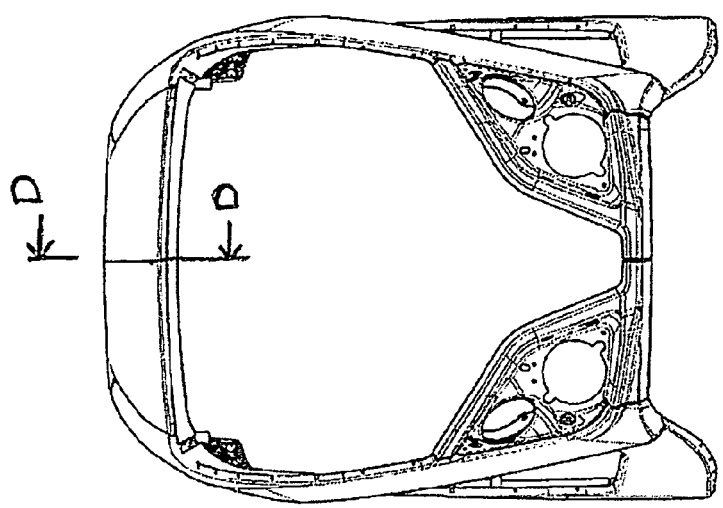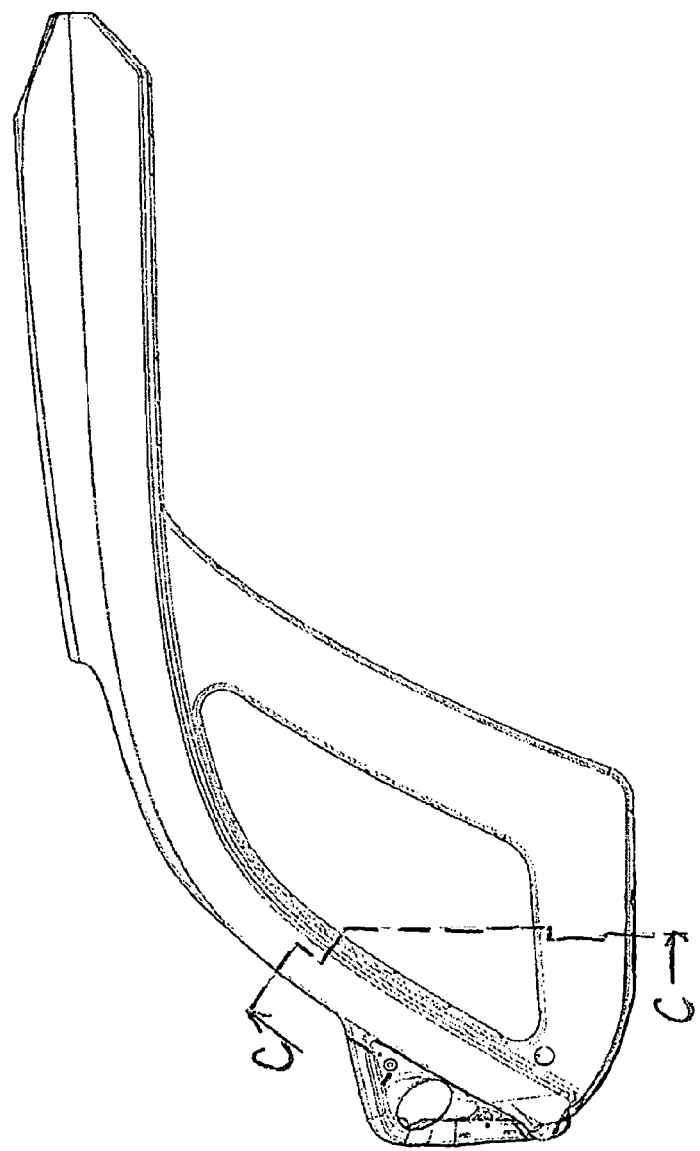
Fig 9f

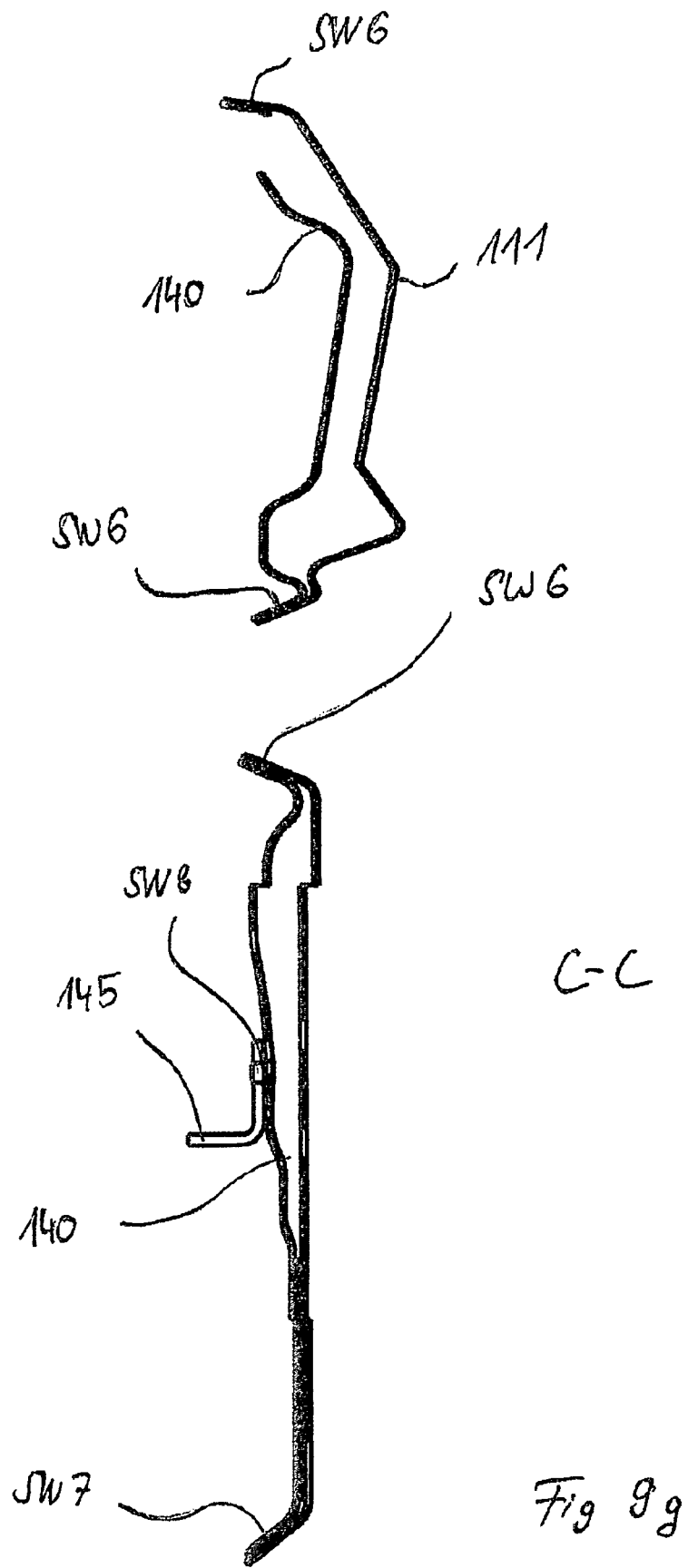

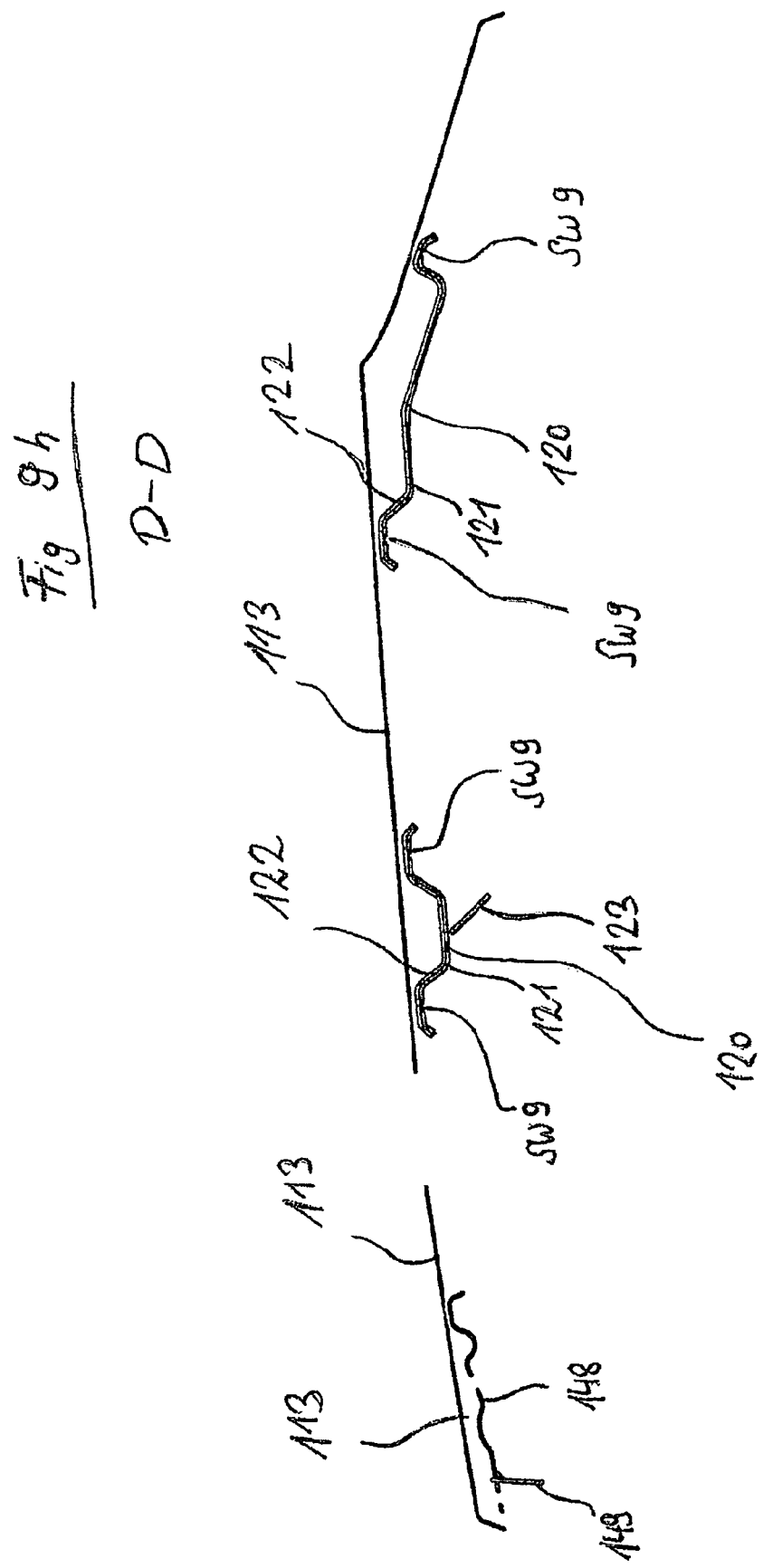

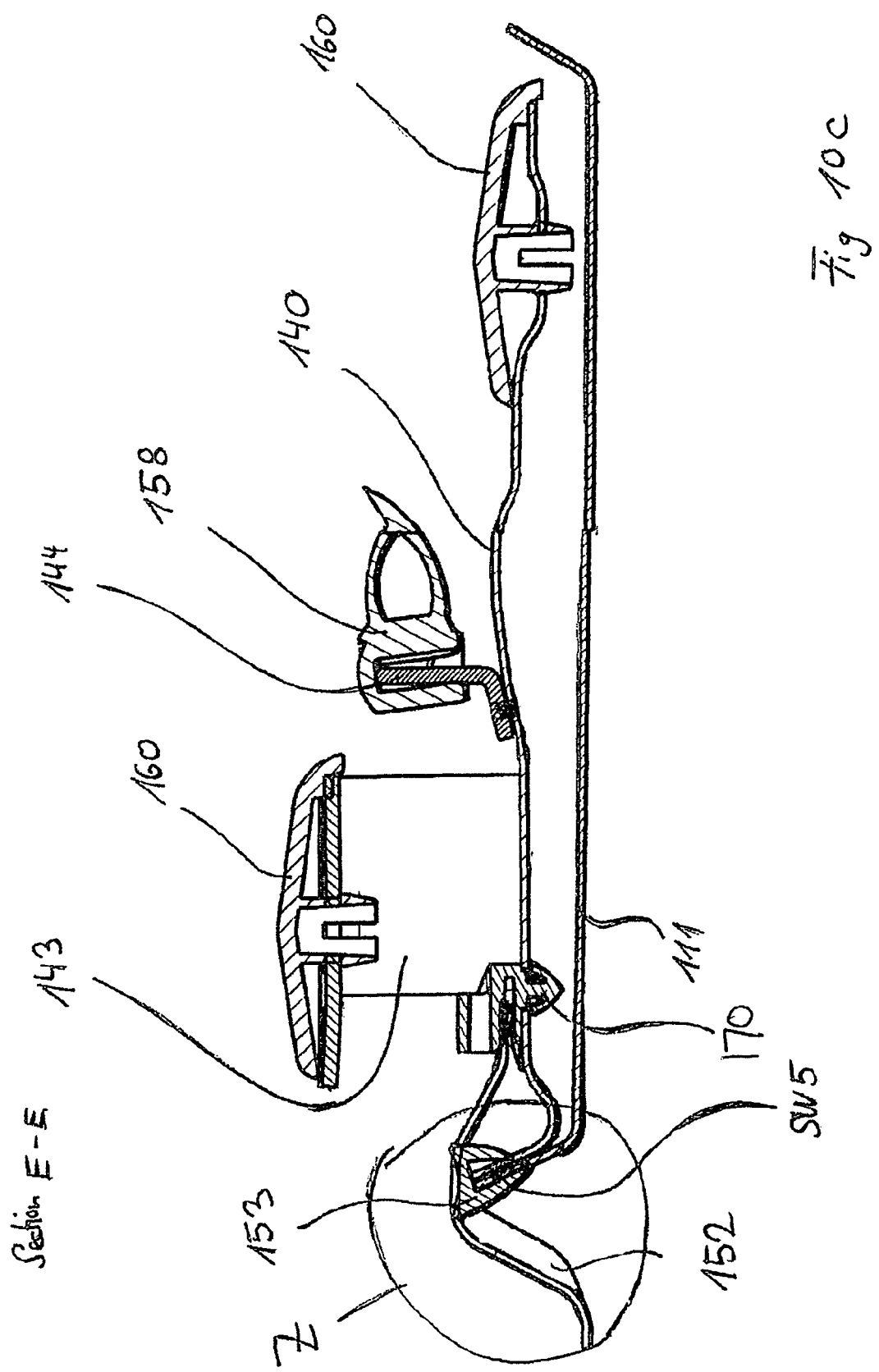

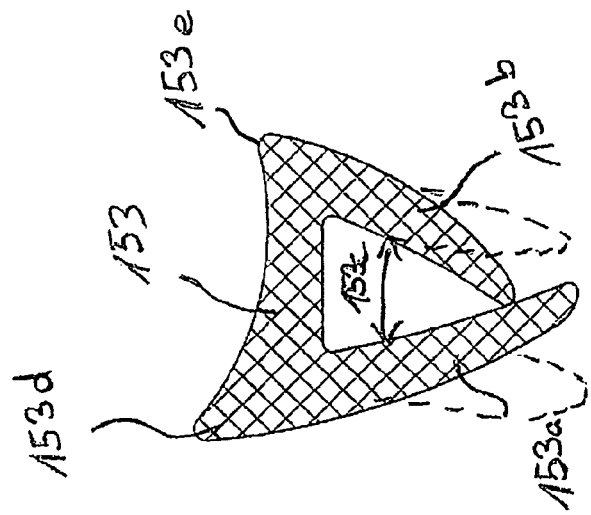
Fig 10d1
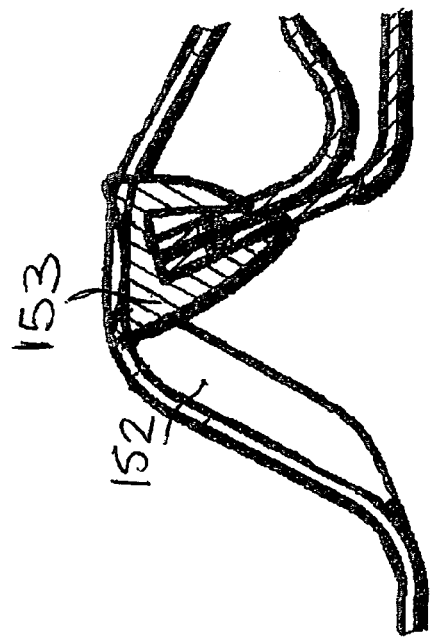
Detail Z
Fig 10d

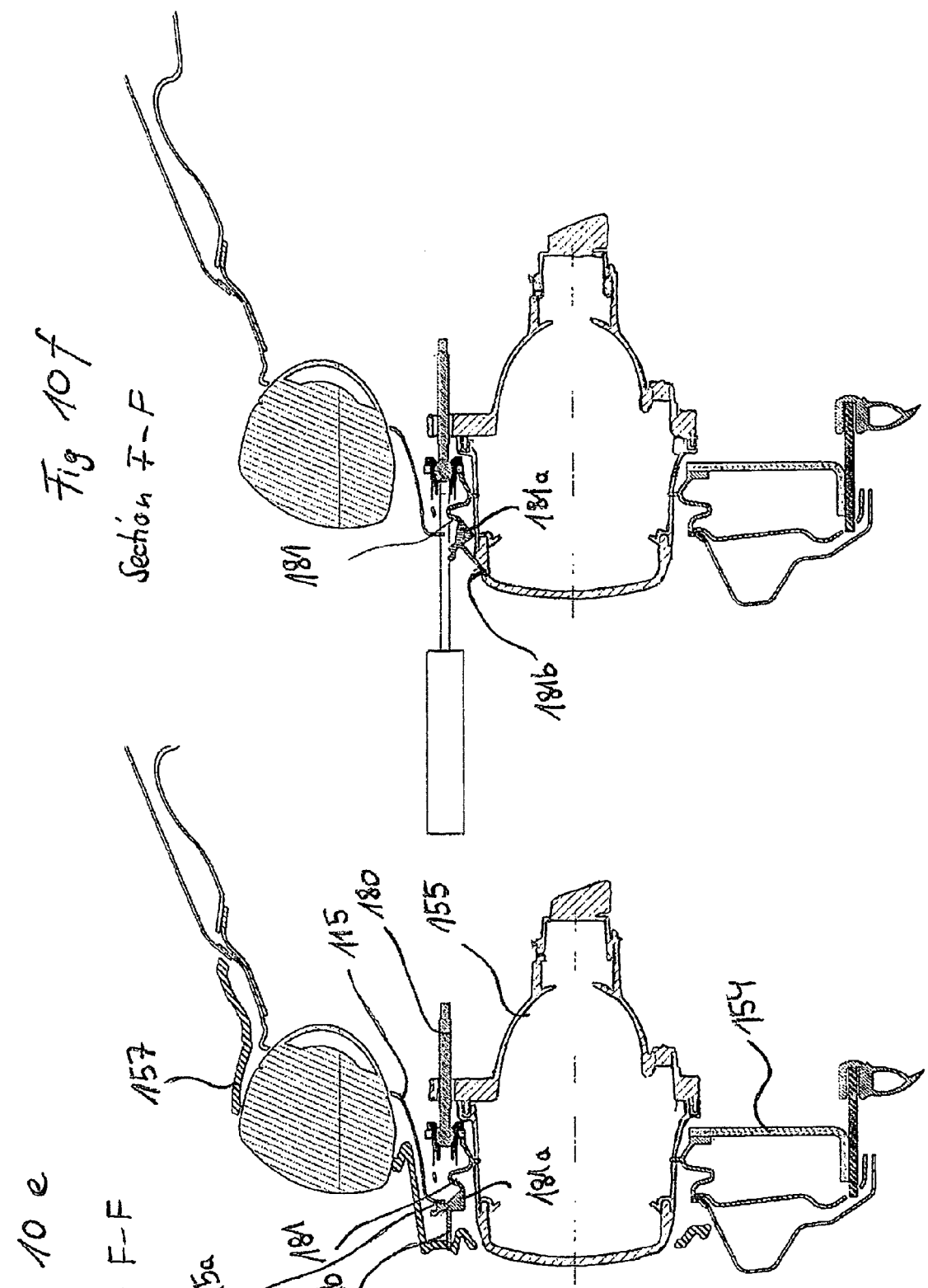

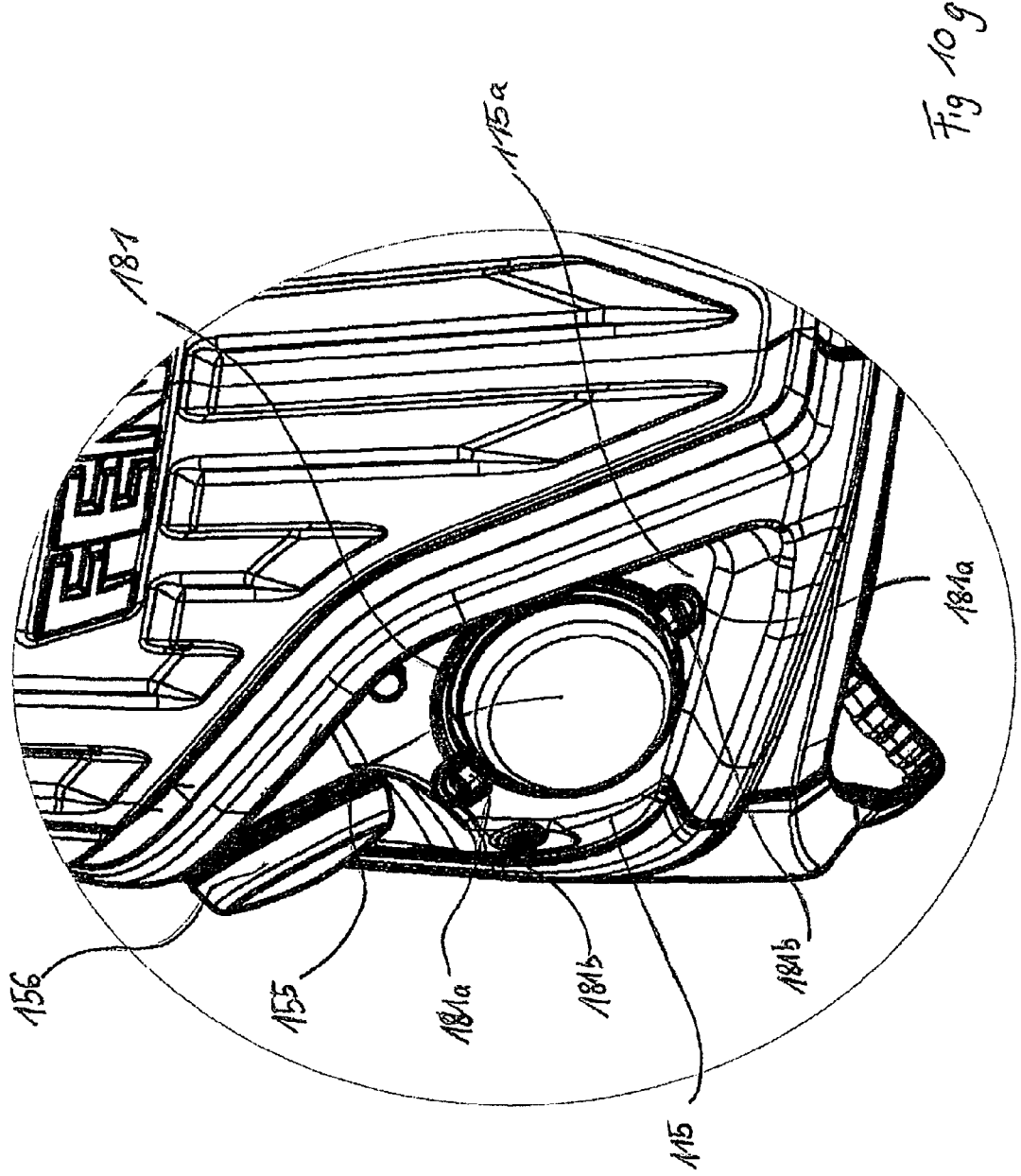

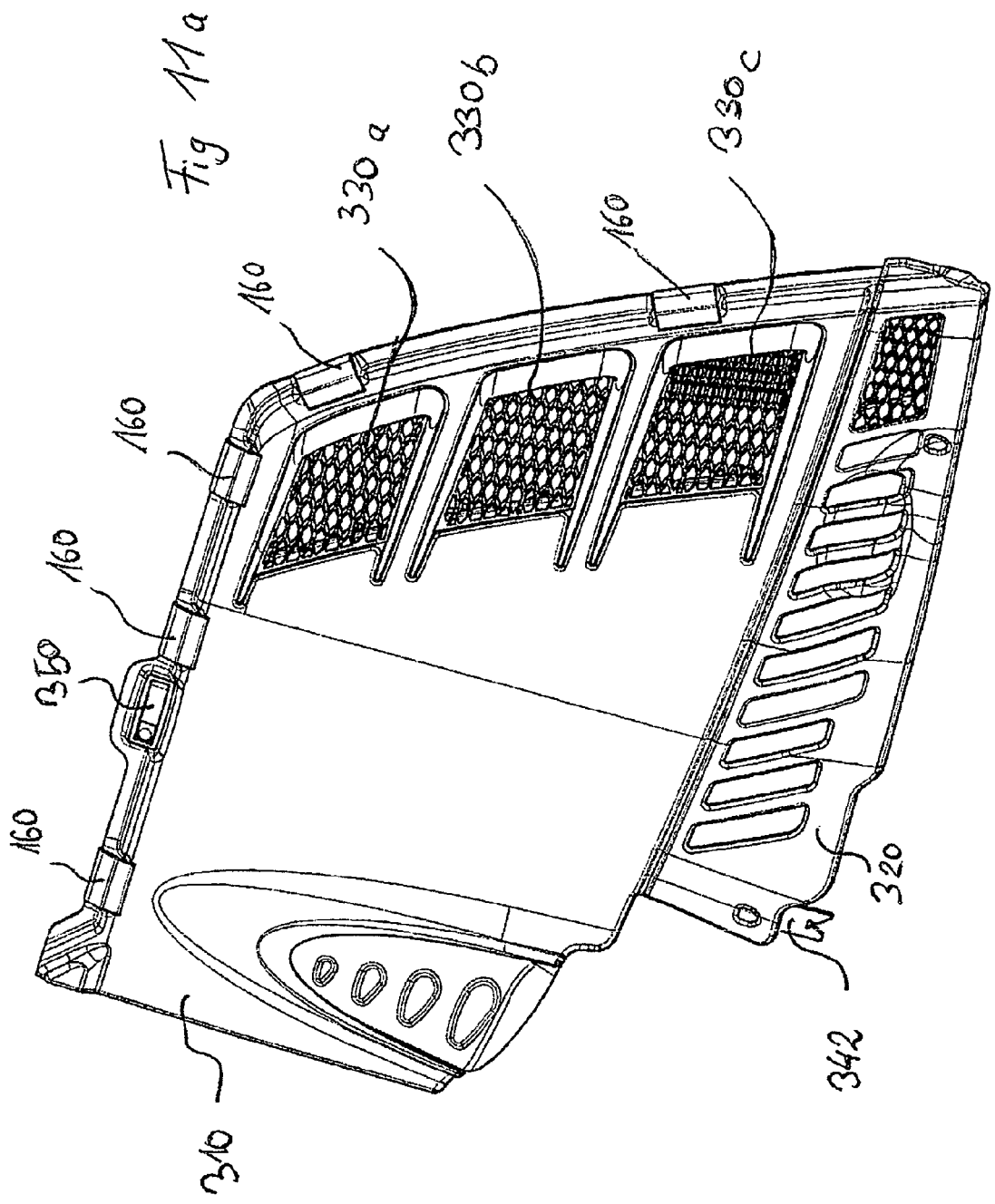

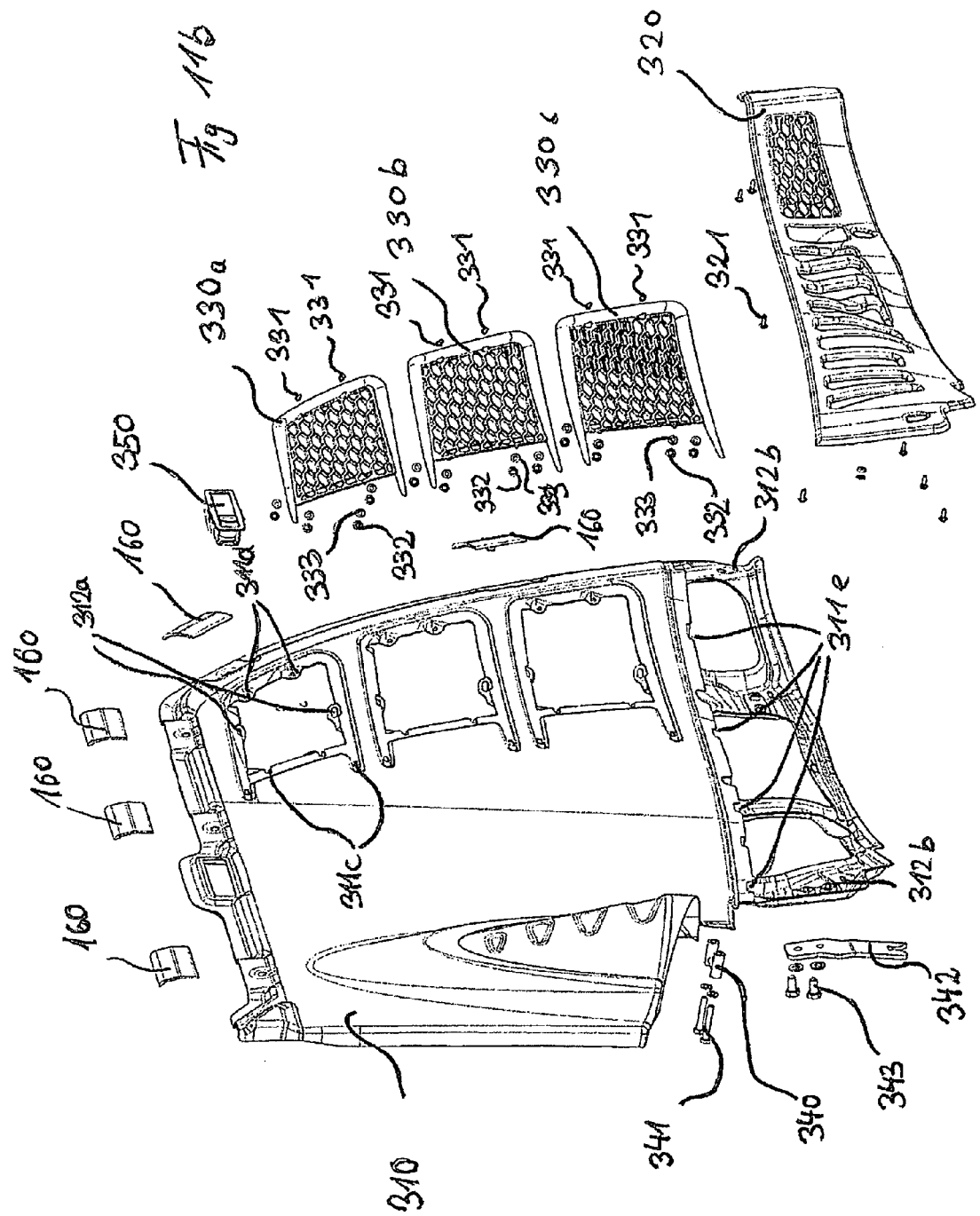

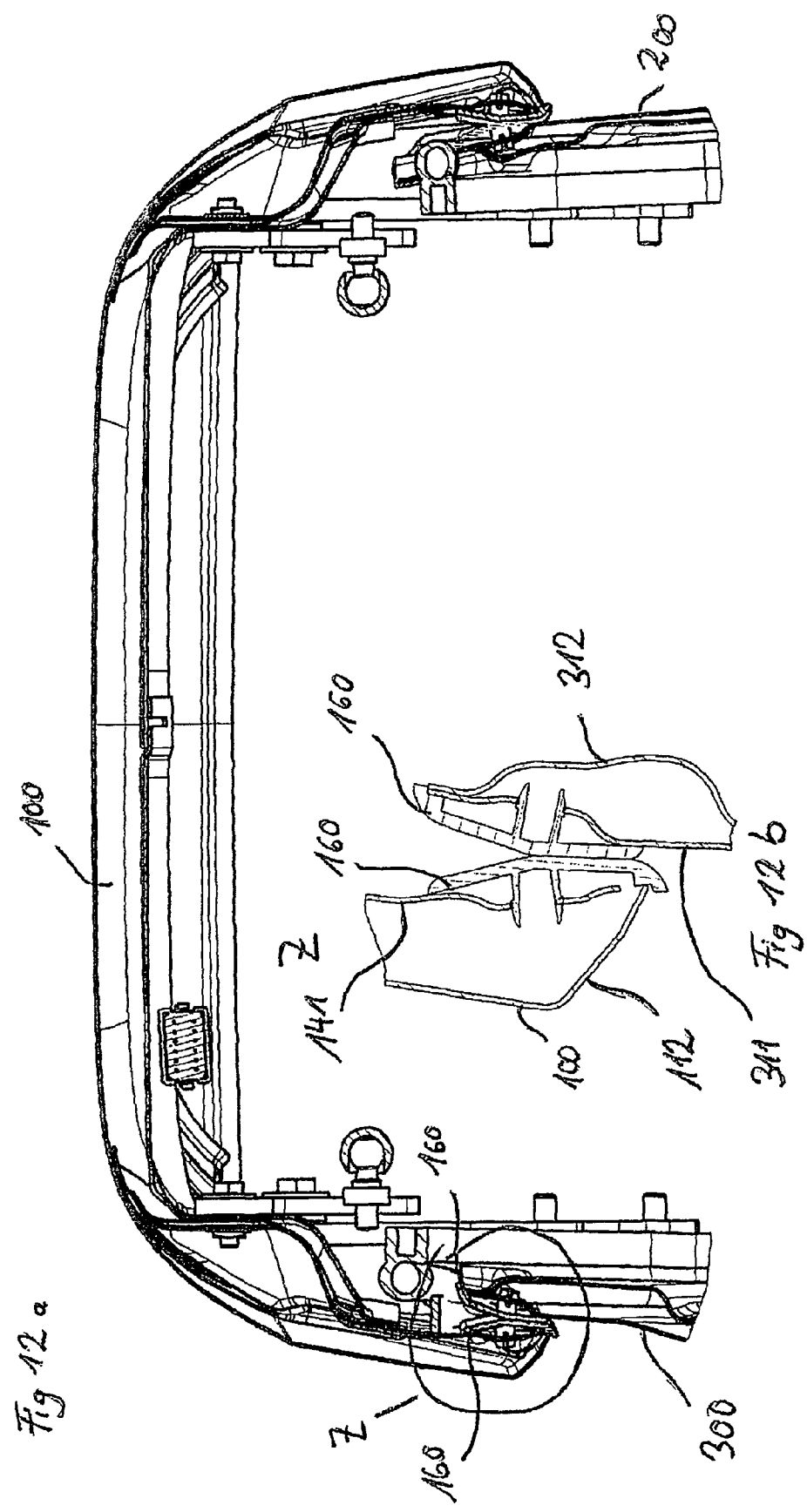

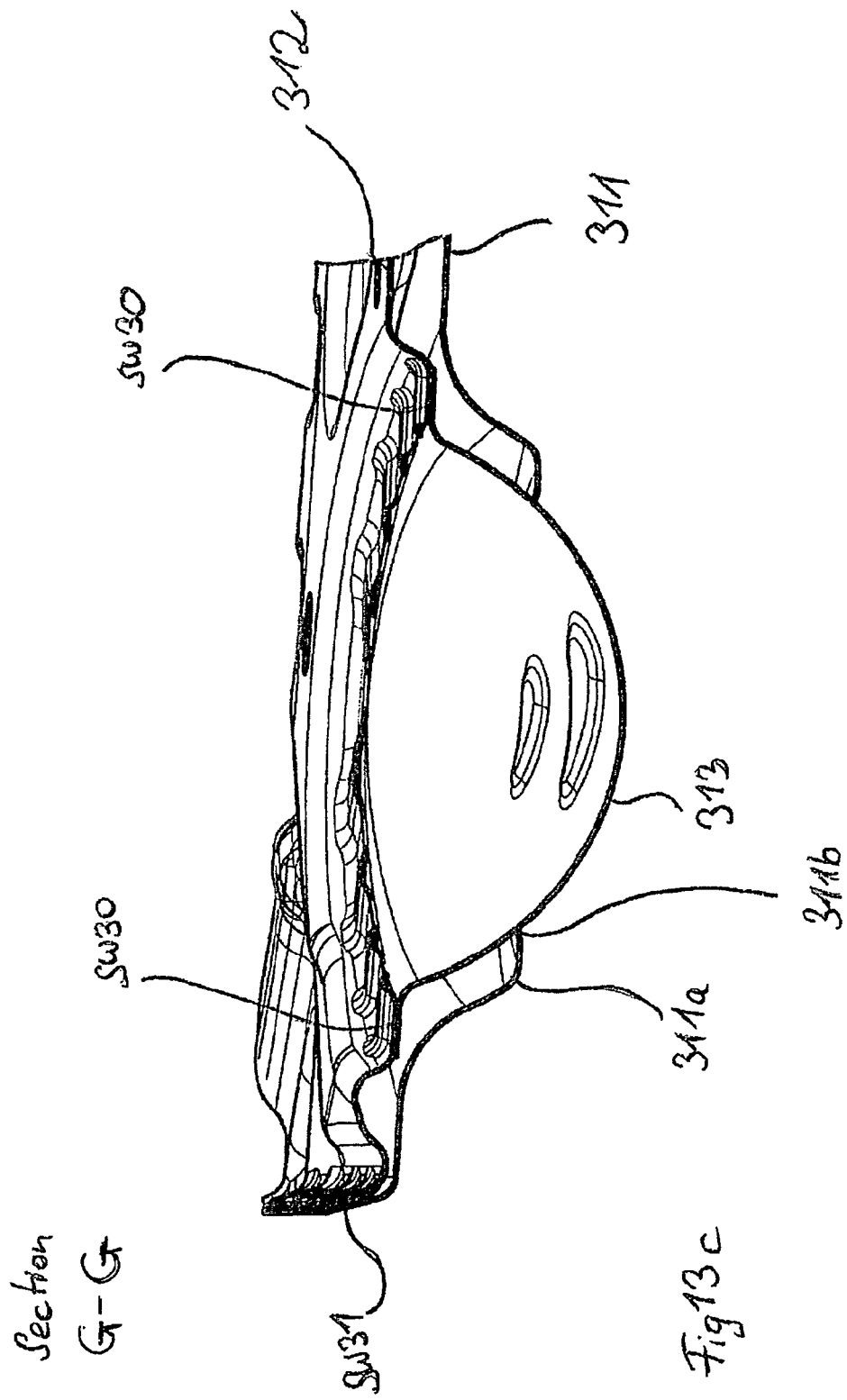

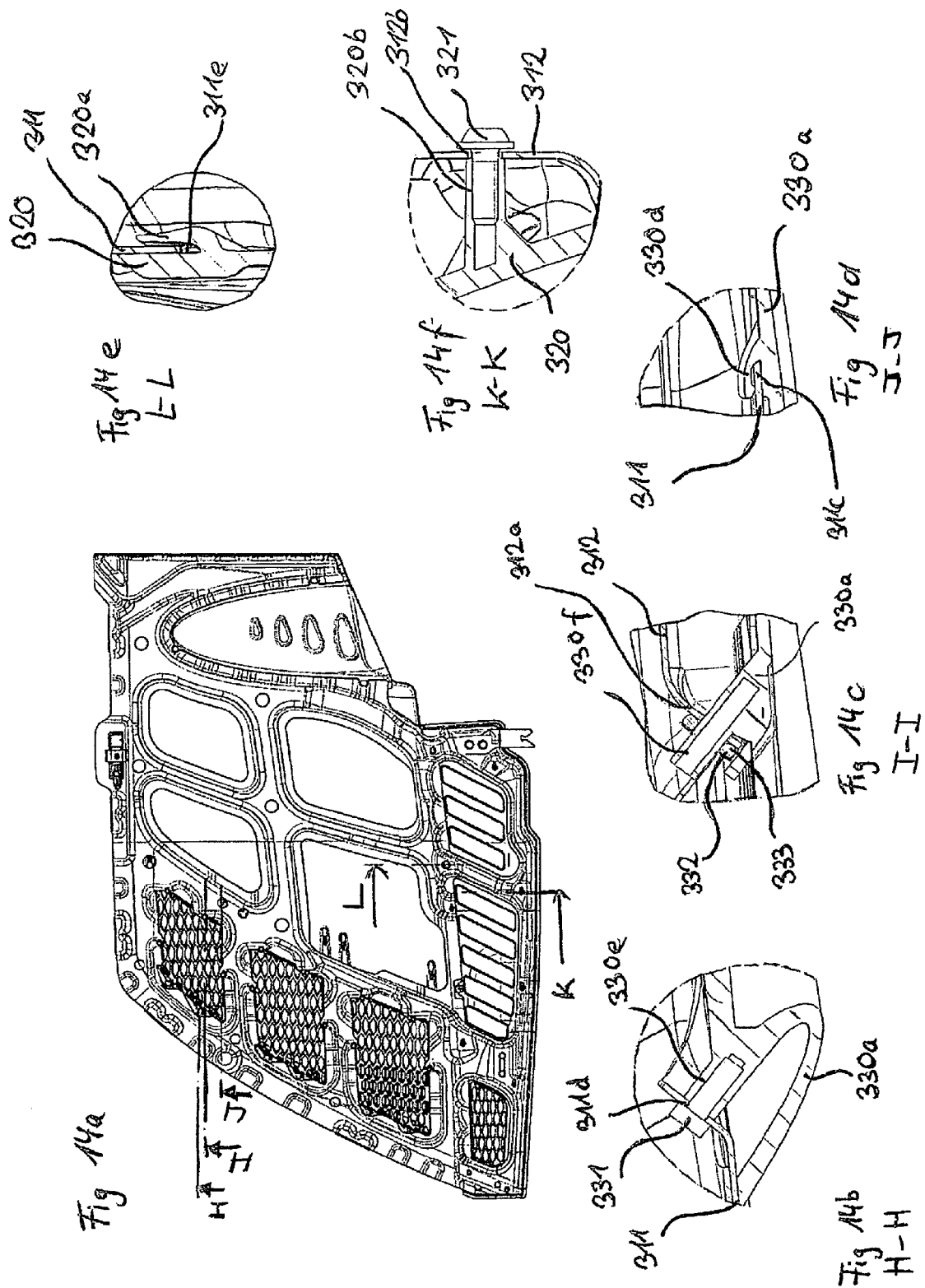

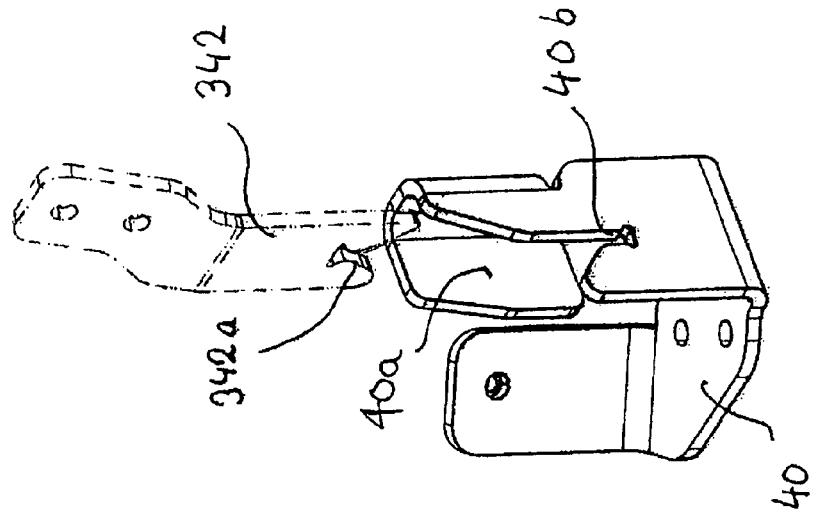
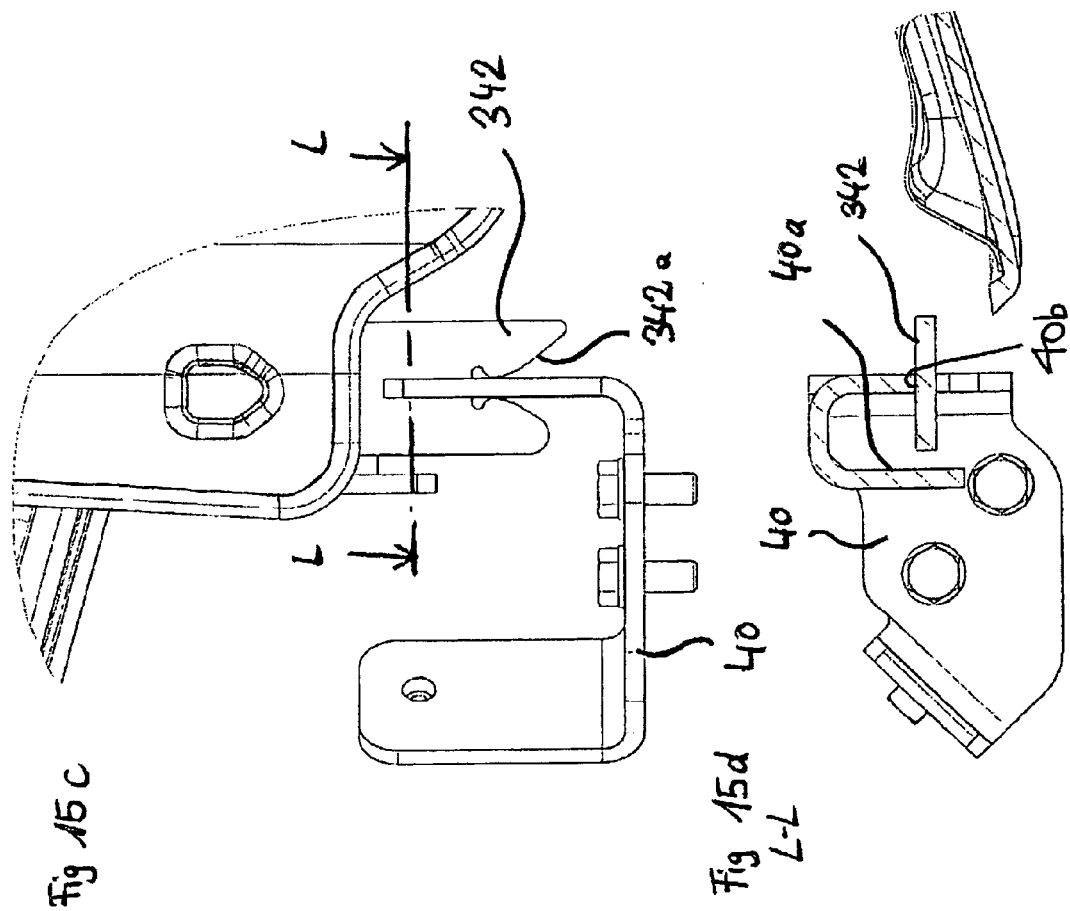

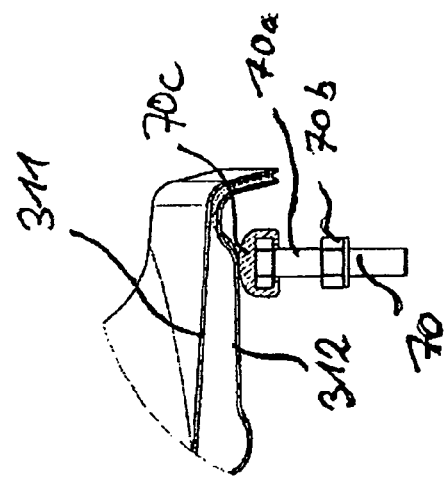
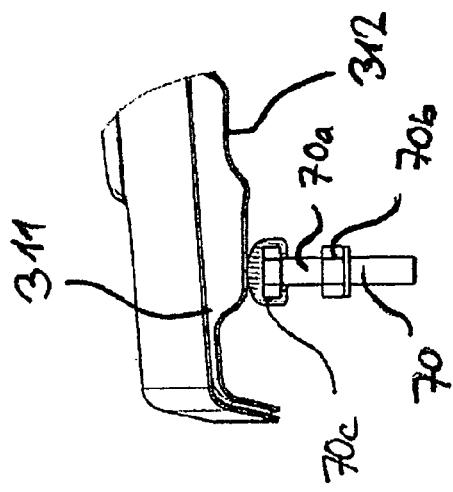
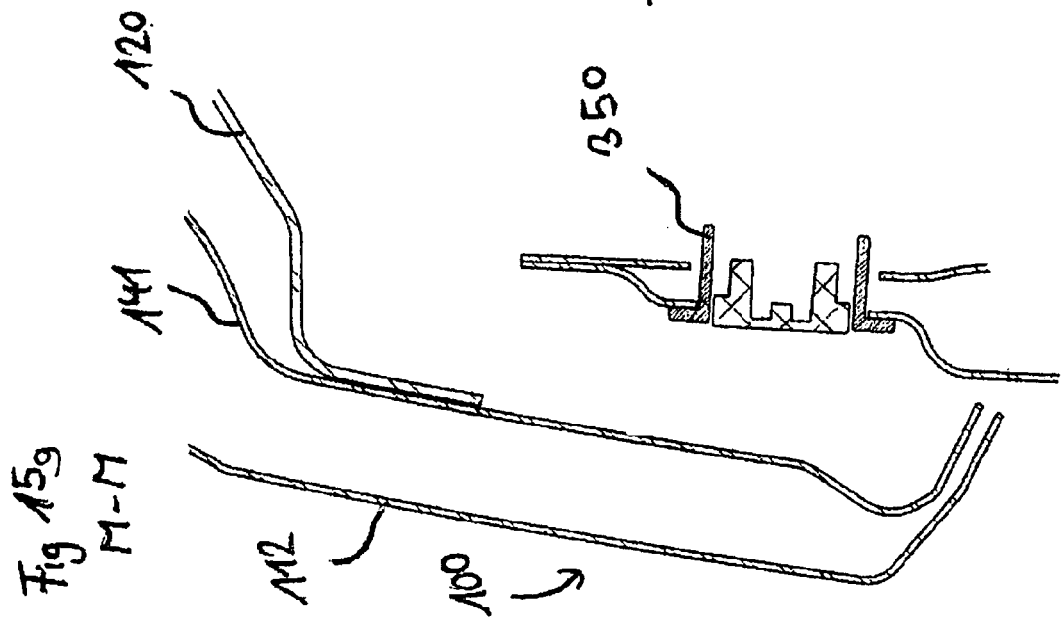

ENGINE HOOD ARRANGEMENT

The invention relates to an engine hood arrangement for a tractor.

Modern tractors mainly are equipped with engine hoods made of plastics material, such as sheet moulded composite (SMC) or long fibre injection moulded (LFI) technology, and/or sheet metal. Compared to sheet metal, plastics material requires higher wall thickness to provide sufficient stiffness and additionally, painting is more difficult as plastic may emit gases when exposed to high temperatures and thereby damage its paint finish. Also manufacturing a hood from reinforced plastics material gives high part costs which are difficult to justify on higher volume vehicles.

It is an object of the present invention to provide an improved hood arrangement which is suitable for use on a tractor or similar vehicle.

Thus according to the present invention there is provided an engine hood for a tractor or similar vehicle, the hood being of generally inverted U-shaped configuration with an upper top portion and downwardly extending side portions, the hood being hinged adjacent one end for upward pivoting between a closed position in which the associated engine is covered and an open position which provides access to the engine, the hood having an outer metal skin and inner metal reinforcing members secured to the inside of the outer skin to form two beam-like structures which extend away from the hinge towards the other end of the hood to stiffen the hood against twisting.

The hood may be provided with inner reinforcing members which extend between the beam-like structures to further stiffen the hood.

The hinge may be mounted on the hood via an inner reinforcing member which extends between the beam-like structures adjacent said one end of the hood.

The outer skin at the other end of the hood may house lighting units and may have an inner reinforcing member extending between the beam-like structures which also supports the lighting units.

The hood may have deeper side portions at the other end of the hood and the beam-like structures may also be of a corresponding greater depth at said other end of the hood.

The greater depth portions of the beam-like structures may each include a cooling aperture for the passage therethrough of cooling air. The other end of the hood may also include a large aperture between the beam-like structures for the passage therethrough of cooling air.

Grills are secured in position in the aperture or apertures, these grills being supported from inner reinforcing members. Seals surround the apertures and are located between the grills and the reinforcing members. These seals cover welding areas and protect the paint finish in contact areas.

These seals are preferably of substantially U-shaped cross-section with one limb of the U being longer than the other to allow easy engagement around an edge of the apertures. The inside of the hood may also carry one or more seals which make sealing contact with components under the hood to ensure the correct flow of cooling air when the hood is in the closed position.

The outer skin is secured to the inner reinforcing members at locations not visible in the finished hood.

A top outer skin panel extends between the beam-like structures and is secured along its longitudinal edges to the inner reinforcing members of the beam-like structures at locations not visible in the finished hood. The longitudinal edges of the top outer skin panel are laser welded to the outer skin of the two beam-like structures.

Apertures may be provided in the inner reinforcing members to allow access to areas where the outer skin is welded to the inner reinforcing members.

The hood is preferably hinged from an adjacent vehicle chassis via a pair of hinges each having a mounting plate having a pair of downwardly open bolt-receiving slots and a bolt receiving hole, the hood being lowerable to engage the bolt receiving slots with their respective bolts and then being securable in position by the insertion of a bolt through the bolt receiving hole and the tightening of the bolts.

Nut brackets for the attachment of hood hinges are secured to the inner reinforcing members of the beam-like structures. These nut brackets preferably carry the nuts on brackets so that the nuts are pulled towards the brackets when the hinge fastening bolts are tightened.

The outer skin is welded to the inner reinforcing members around the edges of air cooling apertures in which grills (and preferably respective grill seals) are subsequently mounted which hide the welds.

The lights are preferably mounted in apertures in the inner reinforcing member at the other end of the hood and the gap between each light and its associated aperture is sealed by a flexible generally annular sealing member which surrounds the light and contacts the light and reinforcing member. Each annular sealing member may include one or more moveable flaps each of which when moved to an open position provides access to a light adjustment screw.

Separate readily demountable side panels are provided to mate with the shallower depth side portions of the top portion of the hood adjacent the hinge to complete the hood. Each side panel preferably has an outer skin with inner reinforcing members which stiffen the side panel. Each side panel includes one or more air cooling apertures in which a grill or grating is at least partly supported from an inner reinforcing member.

An inner reinforcing member of each side panel may extend beyond an edge of the side panel to support a side panel extension. The side panel extension may include one or more air cooling apertures. The side panel extension are preferably made from plastics material and extends over the extension of the reinforcing member.

Adjacent edges of the shallower depth side portions and the side panels are preferably provided with co-operating guide blocks to protect the paint finish and reduce wear as the side panels are attached and detached, the guide blocks being largely concealed when the side panels are mounted in their operating positions.

Each side panel may be held in its operating position by front and rear fasteners adjacent it's lower edge and a central fastener adjacent its upper edge.

At least one lower side panel fastener may comprises a downwardly pointing V-shaped member carried by the side panel which engages with a support member mounted on the chassis which extends perpendicularly to the plane of the V-shaped member. The support member may contact the V-shaped member to position the side panel in the fore and aft direction relative to the chassis. The support member cooperates with the V-shaped member to correctly locate the side panel transversely relative to the chassis.

At least one lower side panel fastener comprises a generally longitudinally extending bar which is received in a cut out formed in a front support member mounted on the chassis.

A side panel may have a raised area which covers an exhaust pipe, the inner reinforcing member of the side panel having a cut out to accommodate the exhaust pipe, a separate raised outer skin panel being secured to the inner reinforcing member over the cut out, and the outer skin of the side panel overlapping the edges of the separate raised outer skin panel to conceal the welding of the separate panel to the inner reinforcing member.

The present invention also provides a method of constructing an engine hood of generally inverted U-shaped configuration with a top portion and generally downwardly extending side portions for a tractor or similar vehicle, the method comprising:

placing transversely extending metal inner metal reinforcing members in a welding jig;

placing two longitudinally extending inner metal reinforcing members in the jig and welding the transversely extending reinforcing members therebetween;

welding a top outer metal skin panel between the longitudinally extending inner reinforcing members, and welding longitudinally extending outer metal skin panels to the longitudinally extending inner reinforcing members at locations where the welds will not show in the complete hood to form with the longitudinally extending inner reinforcing members two longitudinally extending beam-like structures which stiffen the hood against twisting.

The top outer skin panel preferably has its longitudinally extending edges laser welded to the longitudinally extending edges of the outer skin panels of the beam-like structures.

Preferably prior to welding the top outer skin panel in position, a bondline and/or sealing/damping material is deposited on contacting areas of the longitudinally and transversely extending inner reinforcing members. This improves connection between the parts and reduces the number of spot welds required.

The invention also provides a demountable metal side panel for an engine hood, the side panel having an outer metal skin with an inner metal reinforcing member which stiffens the side panel and is secured to the outer skin in locations not visible when the side panel is mounted in its operating position on a vehicle.

The present invention will now be described, by way of example only, with reference to the accompanying drawings in which:

FIG. 2 shows the tractor of FIG. 1 with the hood raised and the side panel in position;

FIG. 3 shows the tractor of FIG. 2 with the side panel demounted;

FIGS. 4b and 4c show left and right hand perspective views of the hood of FIG. 4a;

FIG. 5a shows circled detailed Y in FIG. 4b;

FIG. 5b shows in side view the hinge arrangement and reinforcing members used in the hood;

FIG. 6a shows a front left hand perspective view of the hood;

FIG. 6b shows the hood of FIG. 6a in an exploded condition;

FIG. 7b shows the basic hood of FIGS. 7a in an exploded condition;

FIGS. 7c and 7d show side and front views of the basic hood of FIG. 7a;

FIGS. 7e, 7f and 7g show rear view, top view and perspective view (seen from right bottom down) of the basic hood of FIG. 7a;

FIGS. 8a and 8b show details of the inner reinforcing members used in the construction of the hood;

Figure 1:
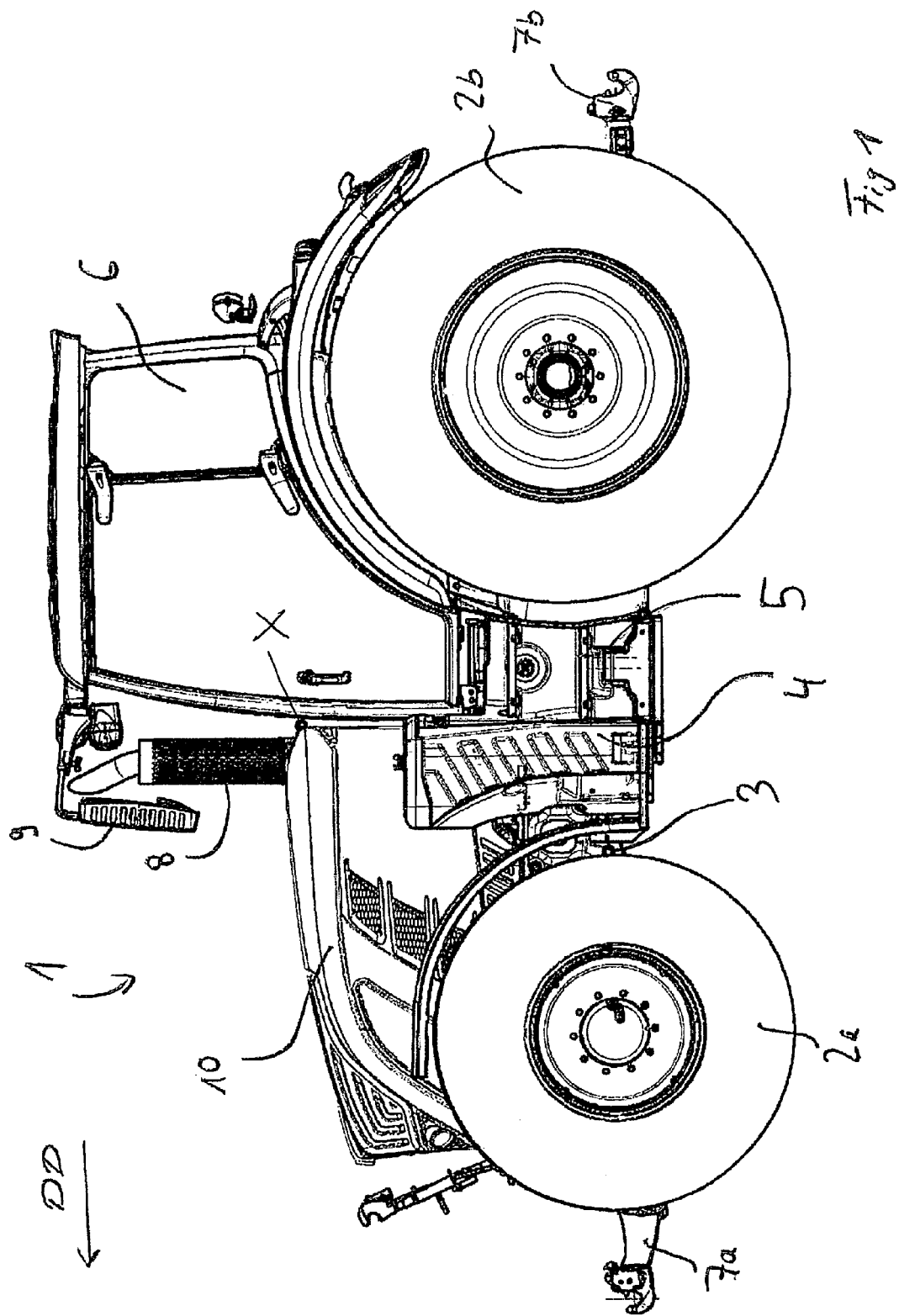
FIG. 1 shows a side view of a tractor having a hood in accordance with the present invention.
Figure 9:
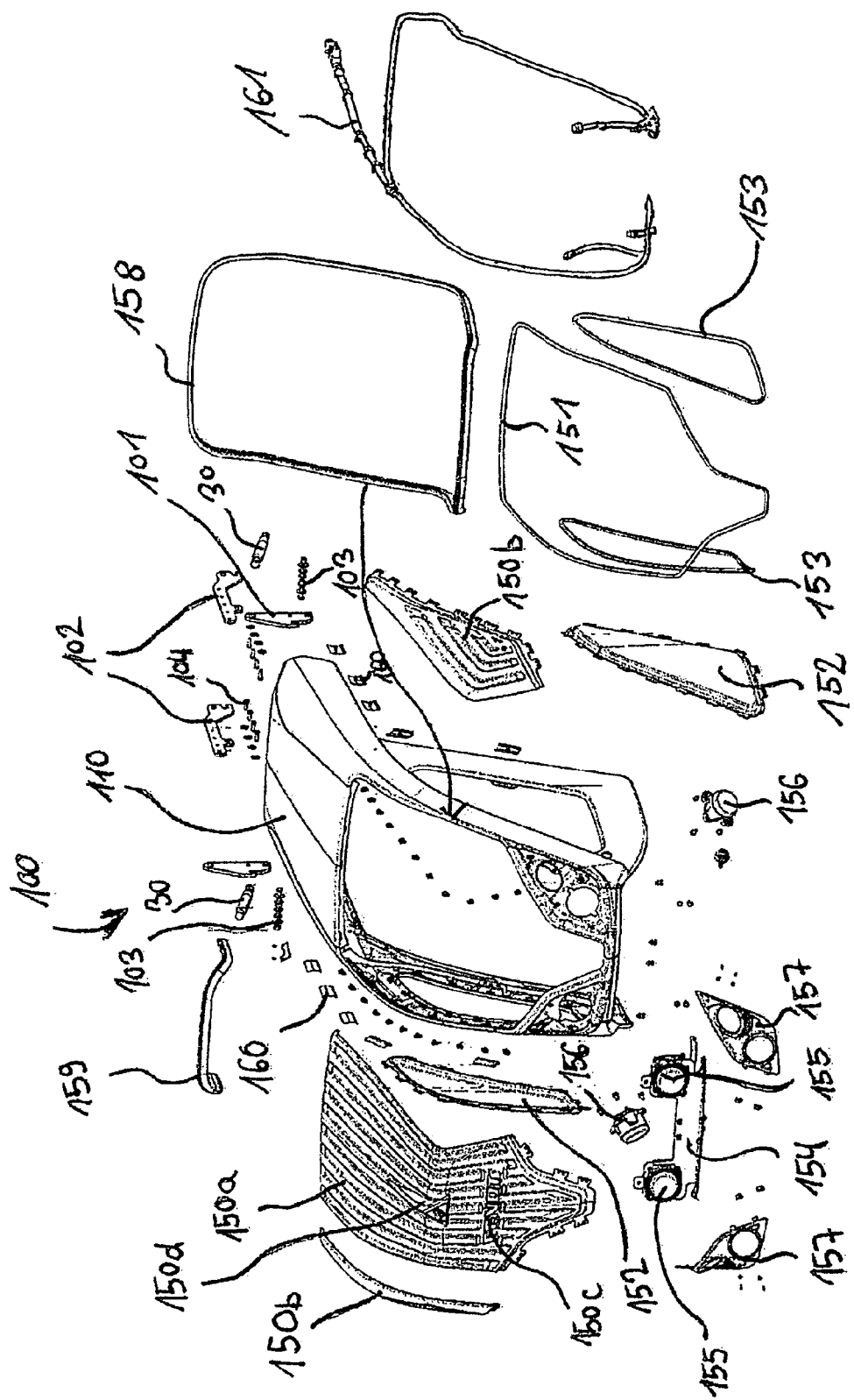
Figure 7A:
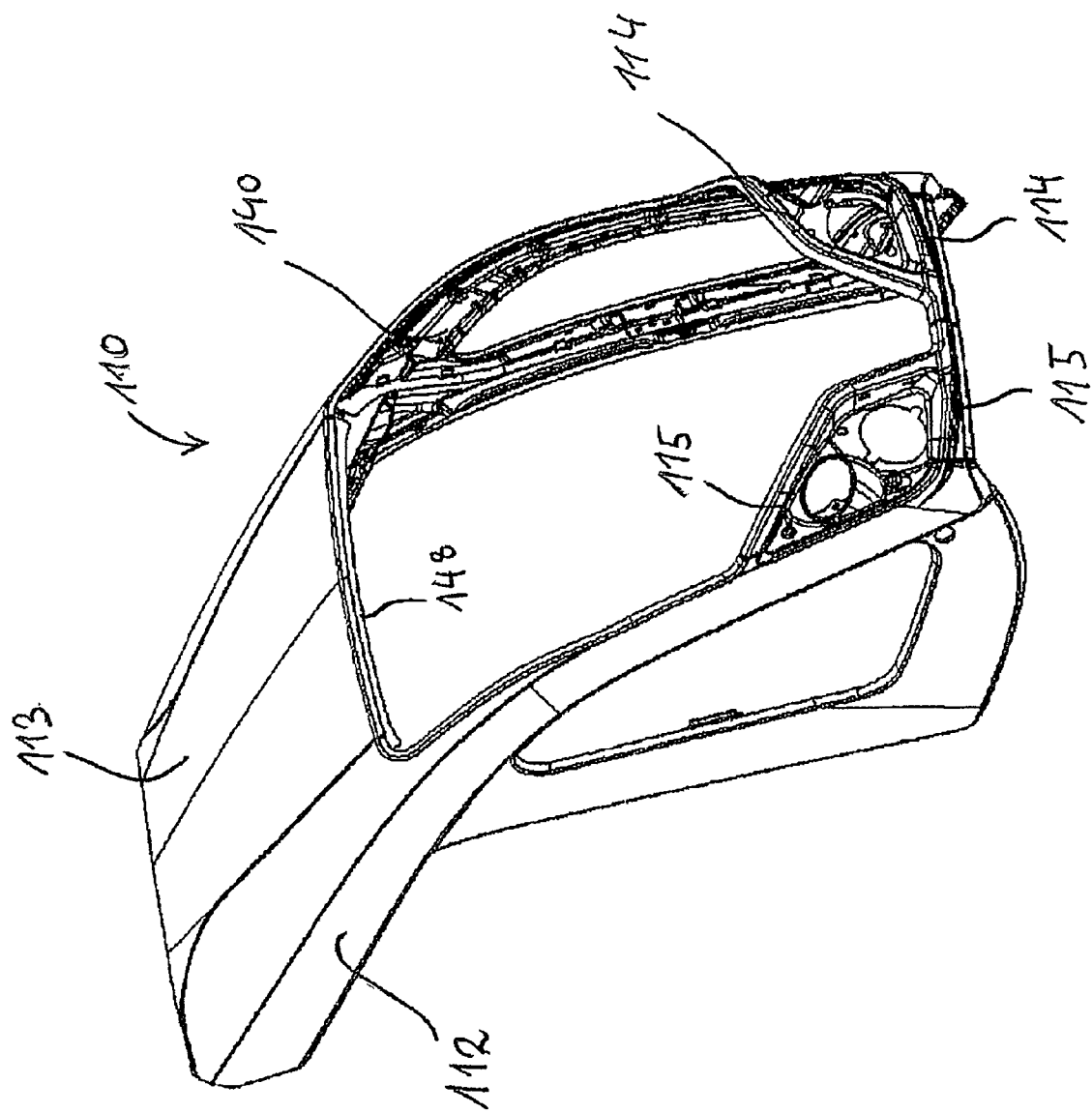
FIG. 7a shows a right hand perspective view of the basic hood construction with no grills or lights fitted.
Figure 7D:
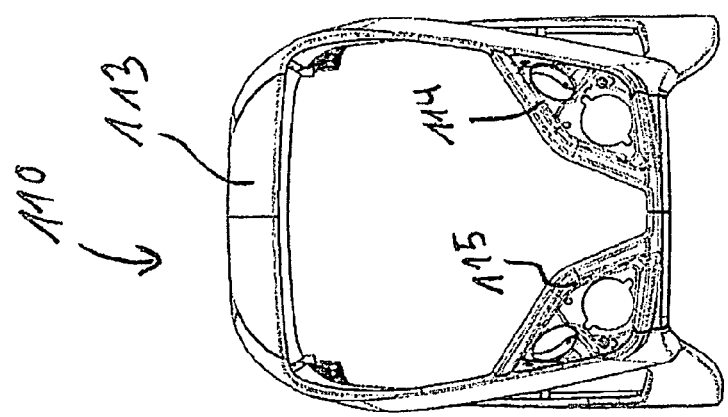
Figure 7C:
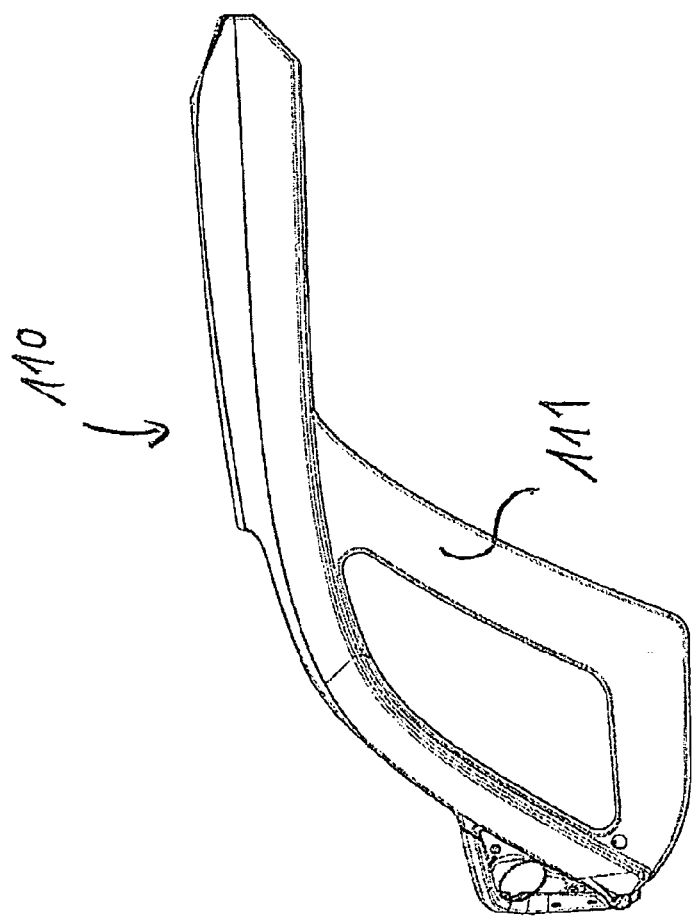
Figure 9B:
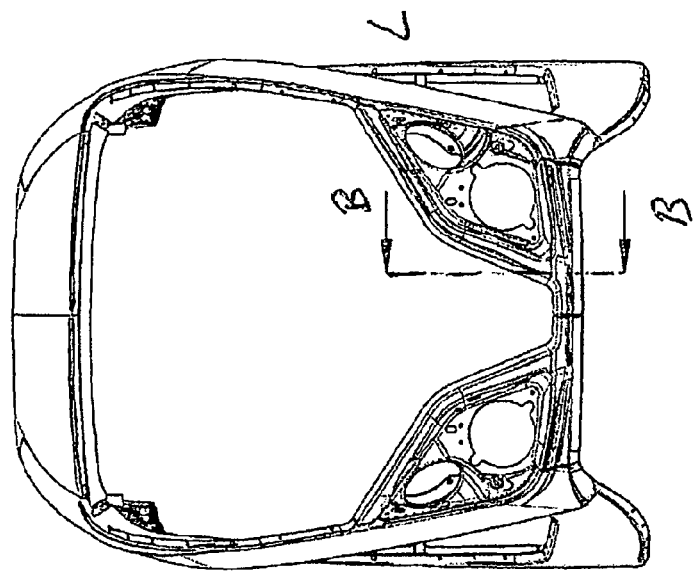
Figure 9A:
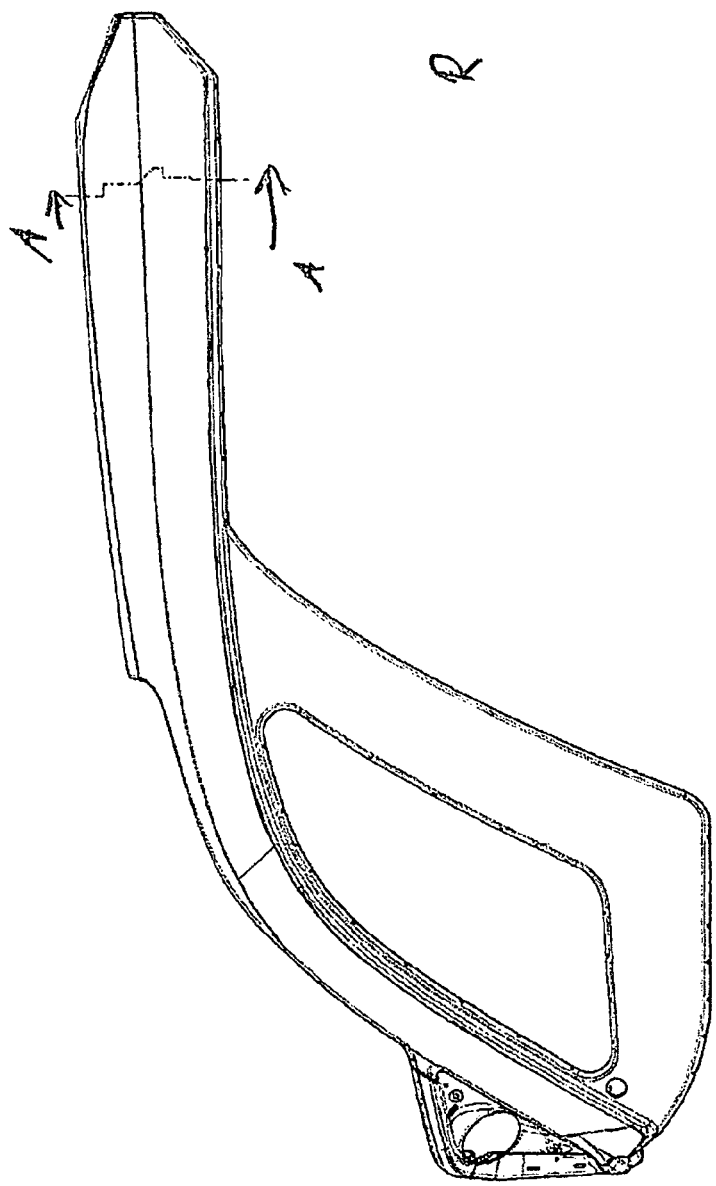
Figure 10B:
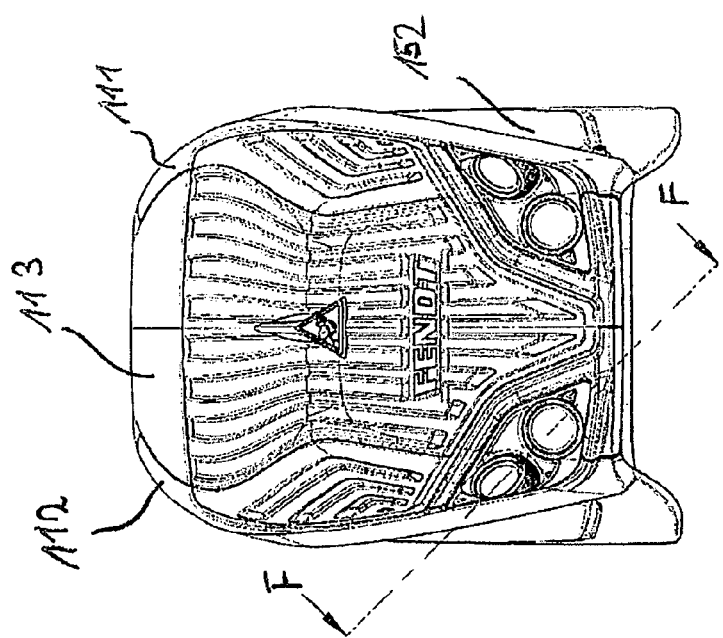
Figure 10A:
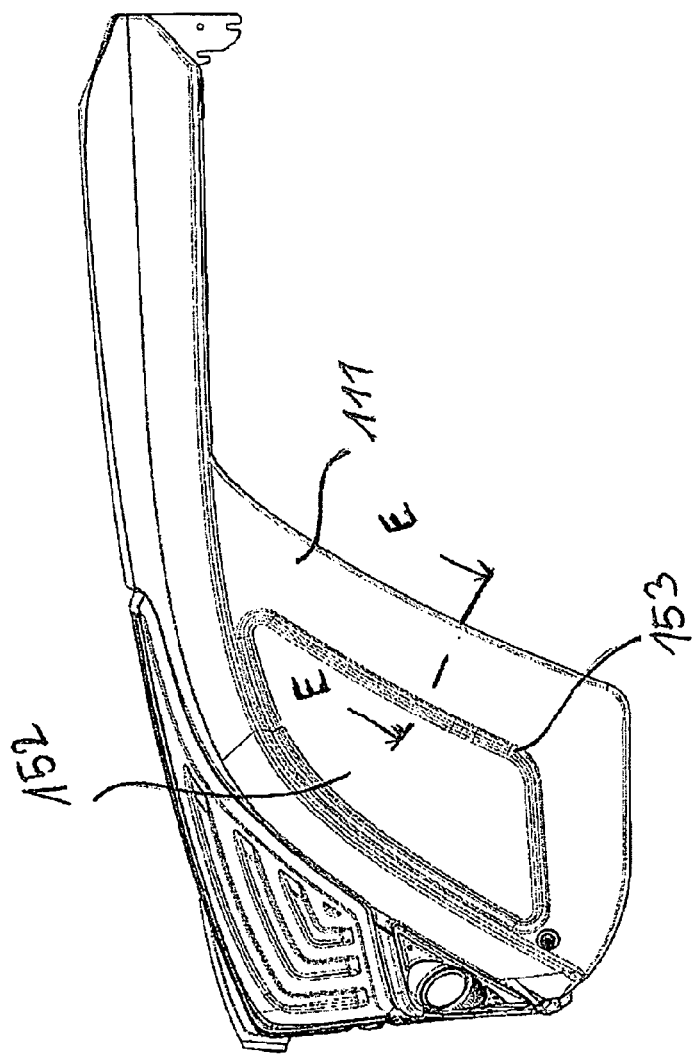
Figure 10H:
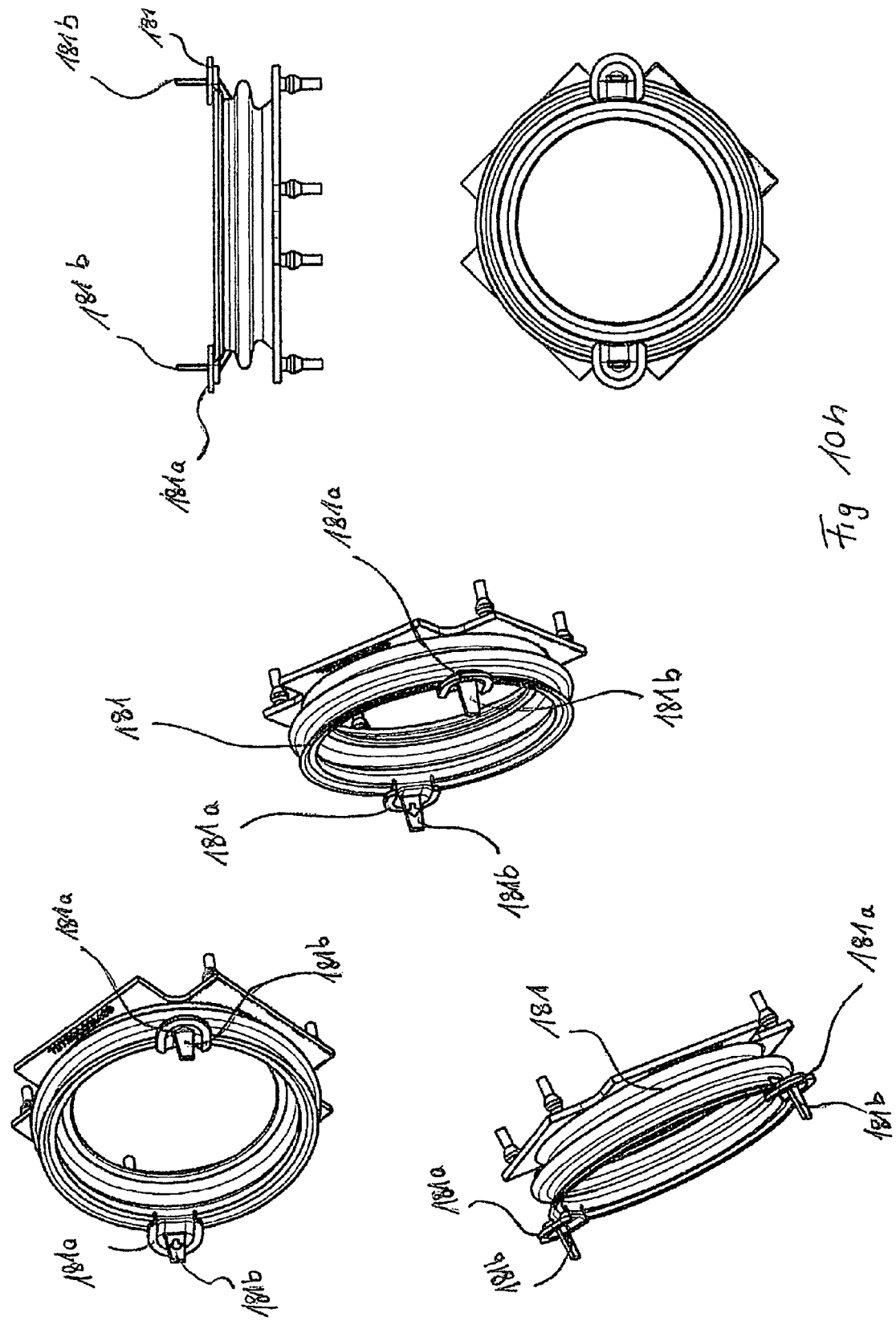
Figure 13A:
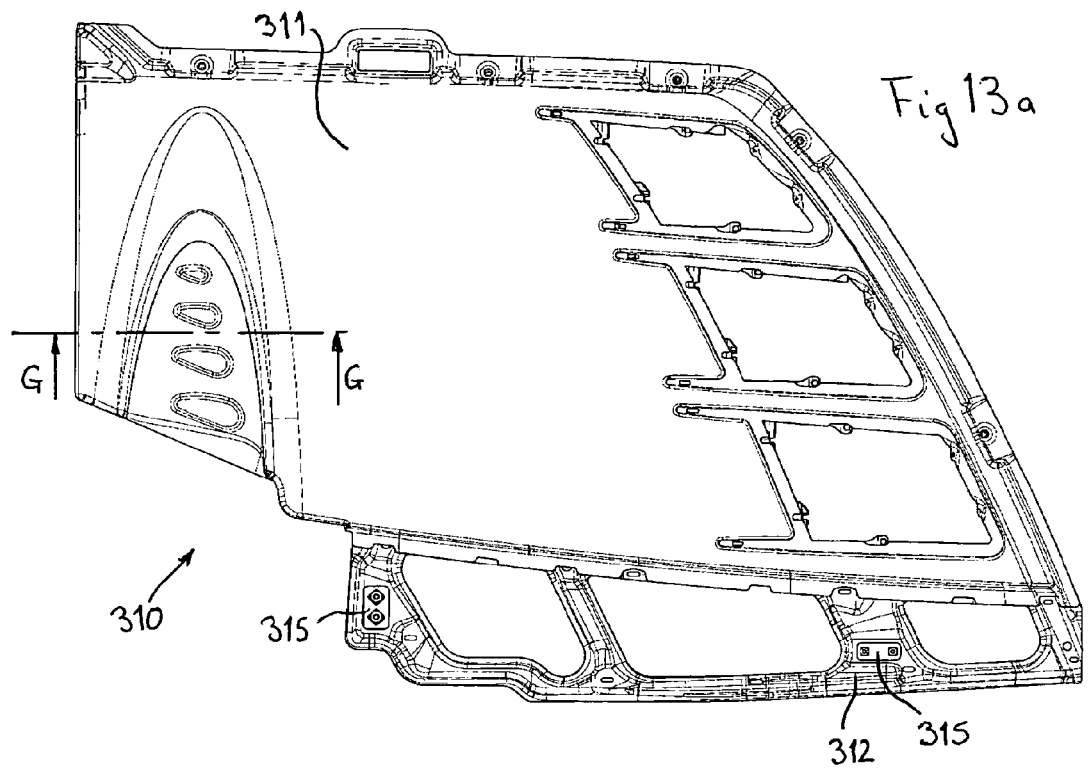
Figure 13B:
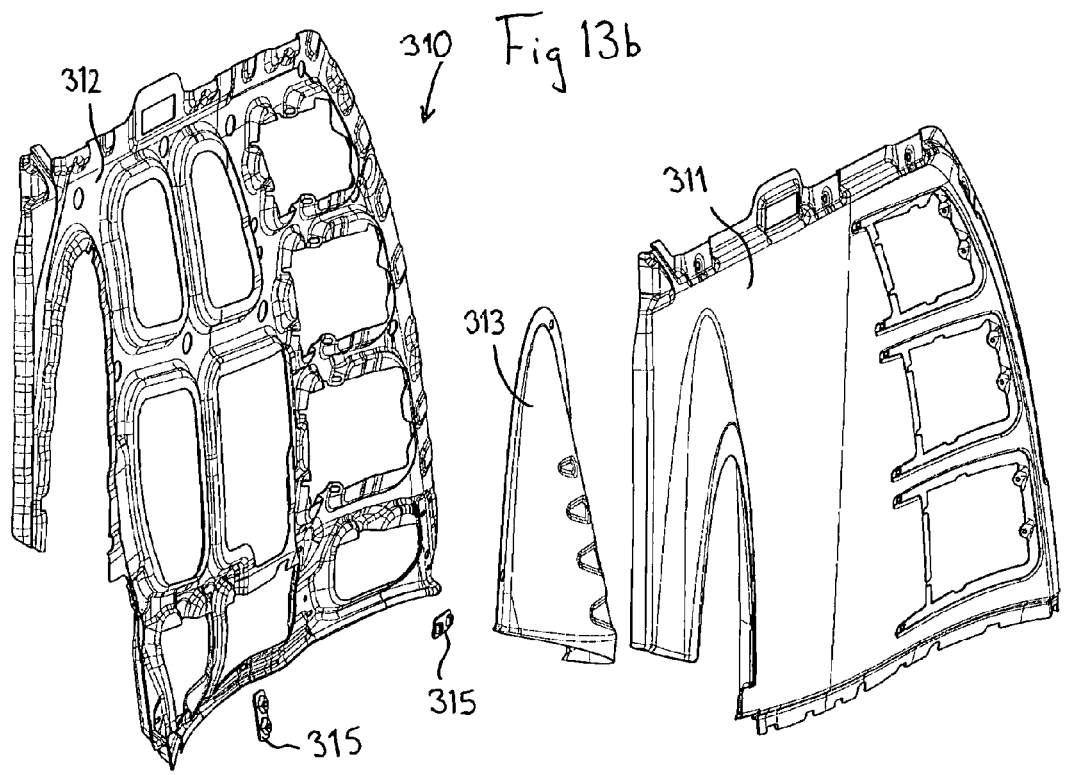
Figure 15A:
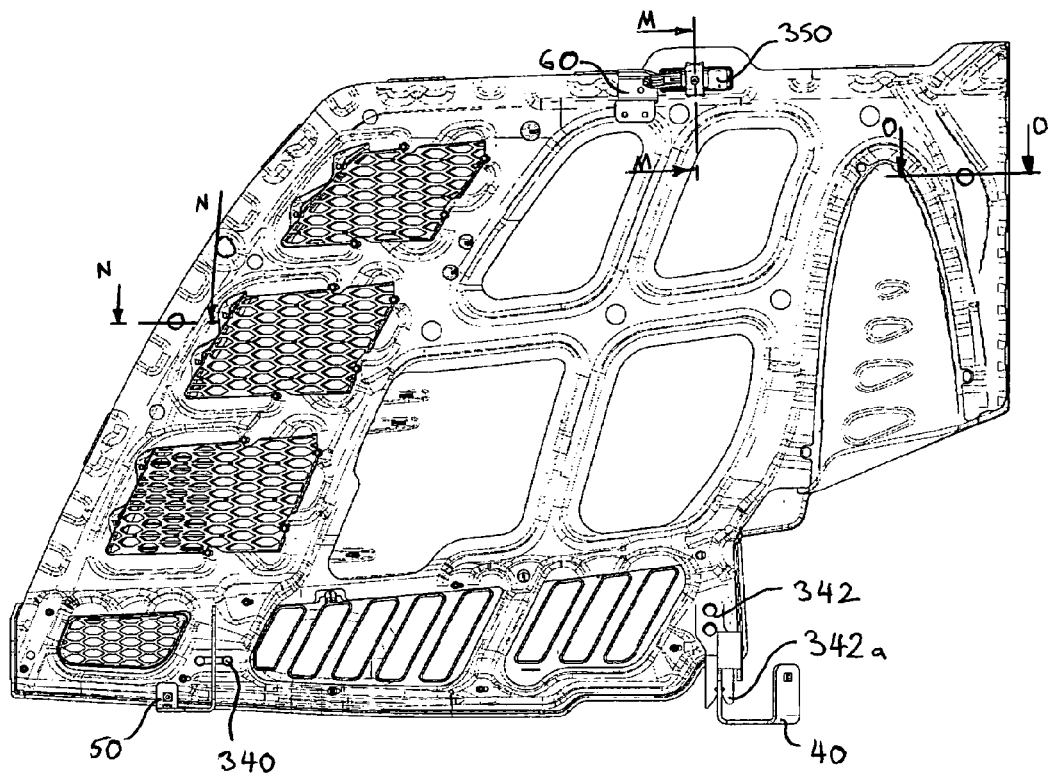
Figure 15B:
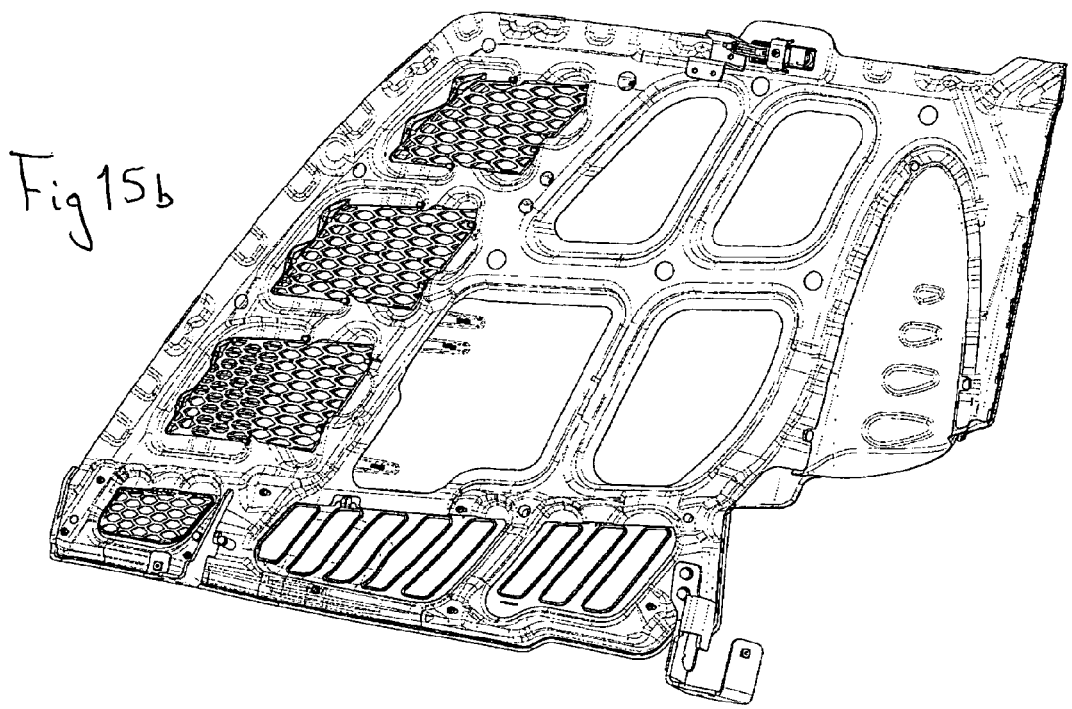
Figures 15H, 15I:
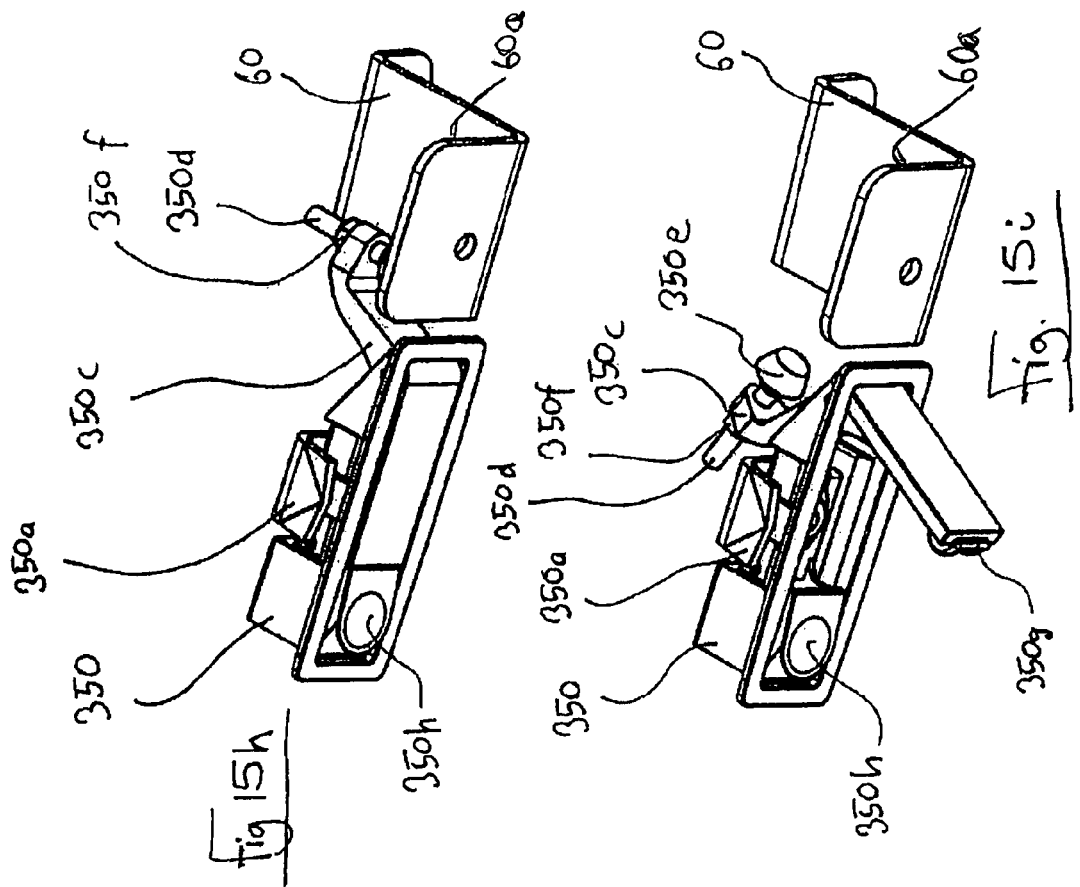

FIGS. 8c, 8d, 8e, 8f and 8g each show plan and left hand perspective views of the various stages in the construction of the basic hood;

FIGS. 9a and 9b show the section lines A-A and B-B;

FIGS. 9c and 9d show details on the section line A-A;

FIG. 9e shows the detail on line B-B;

FIG. 9f shows the section lines C-C and D-D;

FIGS. 9g and 9h show details on lines C-C and D-D;

FIGS. 10a and 10b show sections lines E-E and F-F;

FIG. 10c shows the detail on line E-E;

FIG. 10d shows the detail circled at Z in FIG. 10c;

FIG. 10d1 shows the cross-sectional detail of the seal used in FIGS. 10e and 10d;

FIGS. 10e and 10f show sections on line F-F showing how the lights are adjusted;

FIG. 10g shows details of the light mounting arrangement with the outer cover removed;

FIG. 10h shows details of the rubber seal used around the lights;

FIG. 11a shows a perspective view of a demountable side panel which forms part of the hood of FIG. 1;

FIG. 11b shows an exploded view of the side panel of FIG. 11a;

FIG. 12a shows transverse cross-section through the join between the side panels and the top of the hood;

FIG. 12b shows on a larger scale details of the circled area Z of FIG. 12a;

FIG. 13a shows a side view of the right hand side panel;

FIG. 13b shows an exploded view of the side panel of FIG. 13a;

FIG. 13c shows a section on the line G-G of FIG. 13a;

FIGS. 14a-14f shows details of the grill fastening arrangements used on the side panel of FIG. 13a;

FIGS. 15a and 15b show details of the inner reinforcing member used on the side panel of FIG. 13a;

FIGS. 15c-15f shows details of the lower fasteners used on the side panel of FIG. 15a, and FIGS. 15g-15k show details of the upper fastener and adjustment means used on the hood of the present invention.

Referring to the drawings, FIG. 1 shows a tractor 1 having front wheels 2a and rear wheels 2b and a chassis 3 which supports a fuel reservoir 4 and steps 5 to enter a cab 6. Front lifting means 7a and rear lifting means 7b are provided on both ends of the tractor 1.

Further more, on the right side of the tractor 1, an exhaust end pipe 8 is provided in the close vicinity of the rear mirrors 9 which are attached to the cab 6.

An engine hood arrangement 10 covers a combustion engine 11, cooling system 12 and many other components of the tractor to protect them from dust, guide air and offer general protection. As these components are well-known in the art they will not described in detail below.

FIG. 2 shows a side view with the top section 100 of the metal engine hood arrangement 10 pivoted upwardly about a horizontal transverse axis X (seen in driving direction DD) for accessing components underneath, e.g. the cooling system 12 for cleaning purposes. Detachable left and right metal side panels 200, 300 are provided on both sides partly covering the side engine bay.

As best seen in FIG. 3, these side panels 200 and 300 can be disassembled to access the engine bay.

In the following description reference is taken to left and rights sides seen in driving direction shown by arrow DD.

Figure 4A:
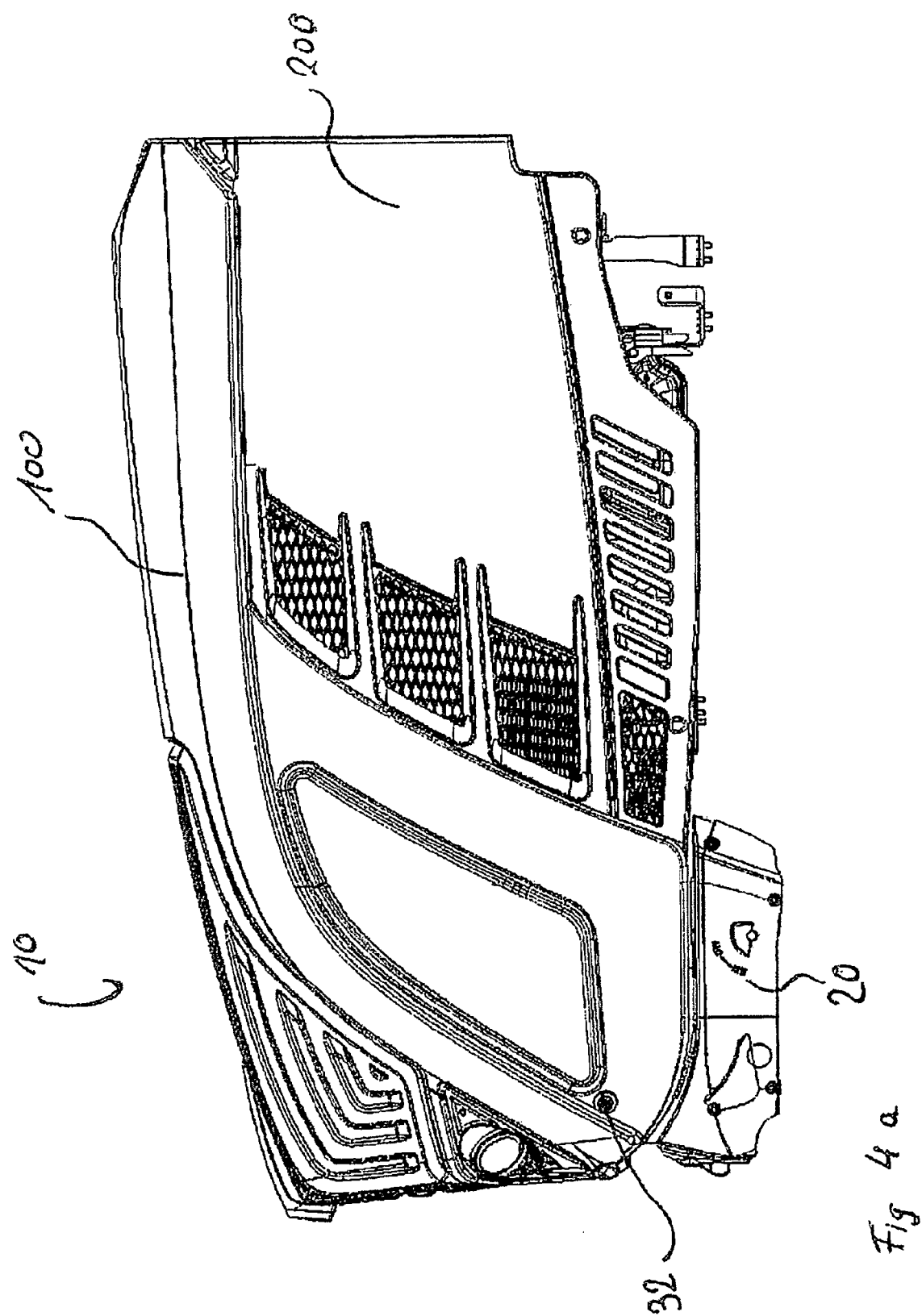
FIG. 4a shows a side view of the hood arrangement of FIG. 1 on its own.

FIGS. 4a to 4c show all components of the engine hood arrangement 10 including pivoting top section 100 and a left side panel 200 and a right side panel 300. In the front area of the engine hood two lower side covers 20, 21 are attached to the chassis 3 to cover fluid piping etc. As shown in FIG. 3, both side panels 200 and 300 can be detached as described later on.

FIG. 5a shows a perspective view with detail Y of FIG. 4b with the top hood section 100 attached to chassis 3. Gas struts 30 are pivotably attached to the chassis 3 and top hood section 100 on both sides to hold the top hood 100 in its opened position. The top hood 100 can be opened by releasing a known locking mechanism (not shown) which is operated by a release button 32 on the left side (see FIG. 4a).

As best seen in FIG. 5b,c,d, the top hood section 100 is supported from the chassis 3 by a pair of support brackets 101 fixed to the chassis 3 by three screws 103a,b and respective cutouts 101a,b. To ease assembly, the support brackets 101 each have two open cutouts 101a which extend through the bottom edge of each bracket, while cutout 101b is a cylindrical bore.

During assembly, screws 103a are fitted in bolt holes in the chassis. Top hood section 100 and supporting bracket 101 is lowered towards the screws which finally slide into both respective cutouts 101a and preliminary secure position of the hood to avoid accidents during assembly. Afterwards third screw 103b is mounted into cylindrical cutout 101b. All three screws can then be tightened after adjusting.

Figure 5D:
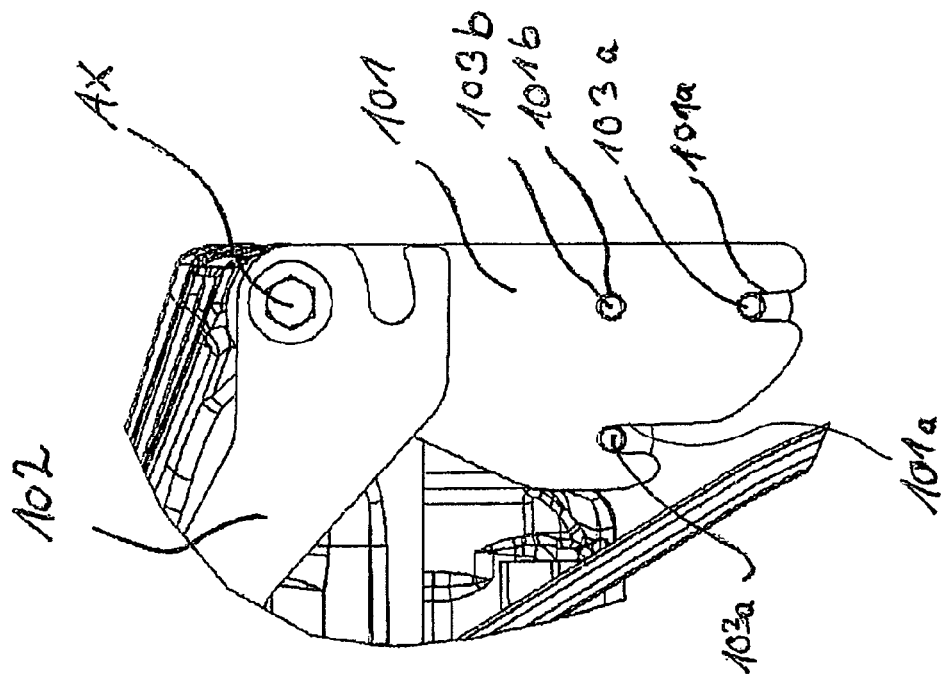
FIGS. 5c and 5d show the details of the attachment of the hinge on a larger scale.
Figure 5C:
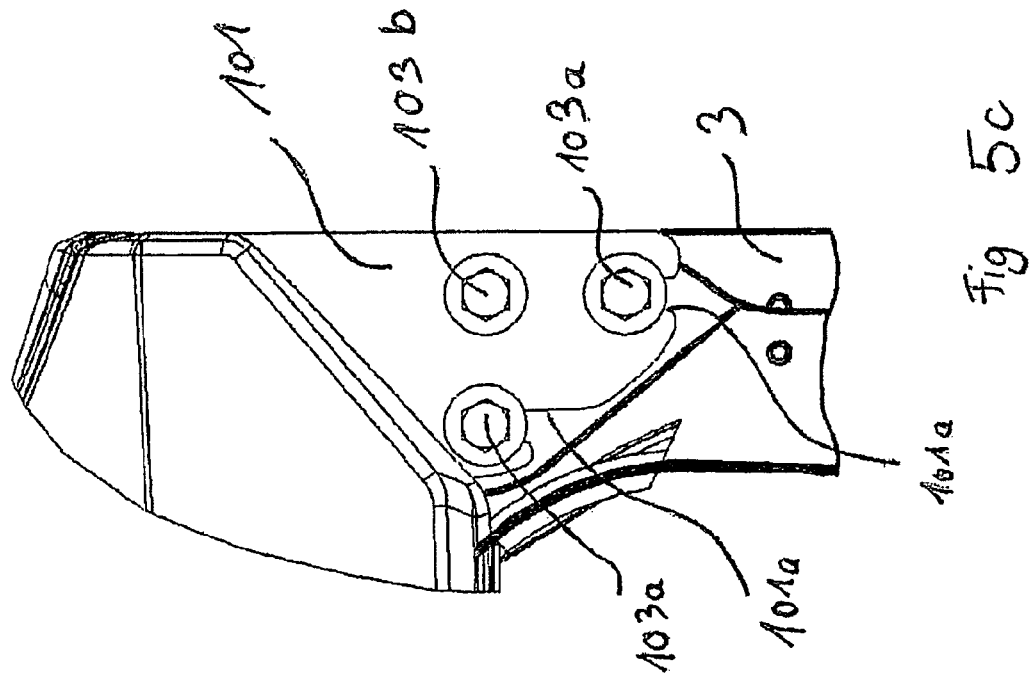

Each supporting bracket 101 is pivotably connected by a pivot pin AX with a connecting bracket 102 which is screwed to the hood top section 100 by screws 104 to allow hood section 100 to pivot about axis X (see FIG. 5d).

As shown in FIGS. 6 a and 6b, top hood section 100 consists of a main welded assembly 110, a front grill 150 which itself is in three parts namely a main grill part 150a, two side front grill parts 150b and a nameplate 150c and a company logo 150d. Front grill 150 is attached to the main welded assembly 110 together with a seal 151 by screws to avoid damage to the paint finish. Similar, side grills 152 are attached to main welded assembly 110 with seals 153 by screws.

In the front area of the hood 10 a light console 154 is provided which adjustably supports main lights 155. In addition working lights 156 are mounted on the main welded assembly 110 in a fixed position. A trim cover 157 is then attached to welded assembly 110 by screws to cover the light assembly. Inside the hood wiring 161 supplies the lights with electric power.

Inside of the top hood section 100, a seal 158 is mounted which comes into contact with mating surfaces on the cooler package or chassis parts to avoid air bypassing heat exchangers. In the rear area of the hood another seal 159 is mounted on the hood which gets into contact with mating surfaces on components in the rear engine bay.

The edges of top hood section 100 which comes into contact with side panels 200 and 300 are provided with spaced guide parts 160 to protect the paint of the top hood section 100 and the side panels 200,300 when the side panels are being attached or removed.

In accordance with the present invention, the hood welded assembly 110 is made of a double skin construction as described in FIG. 7a-g.

The welded assembly has an outer skin formed by a top panel 113 and two outer left and right side panels 111 and 112 and two front panels 114 and 115.

The outer side panels 111 and 112 are reinforced by inner reinforcing members 140 and 141 respectively which are welded to the inside of panels 111 and 112 to form beam-like structures which extend away from the hood pivot axis X towards the other front end of the hood. These beam-like structures are joined at the hinge end of the hood by an inner reinforcing member 120 which is formed from two parts 121 and 122 which are spot welded together. A sealing support 123 on which seal 159 is mounted is also spot welded to reinforcing member 120. Desirably, as best seen in 9c and 9d, welding the inner reinforcing members 140, 141 to the inside of panels 111, 112 forms hollow beam-like structures.

A central inner reinforcing member 148 also extends between the beam-like structures beneath top panel 113. Front inner reinforcing member 130 which is constructed from left and right 131 and 132 which are spot welded together also extends between the beam-like structures behind the outer front panels 114 and 115.

The inner reinforcing structure is shown in FIG. 8c and has a large central aperture 110' and two side apertures 140' and 141' in which grills 150a, 150b and 152 are mounted by clips which engage the areas of the reinforcing members which define these apertures.

As shown in FIG. 7e (rear view), 7f (top view) and perspective view 7g (seen from right bottom down), a horizontal support plate 133 which is needed for supporting a sealing connection and a left light support 134 and a right light support 135 which is needed for light assembly are spot-welded to the left front reinforcing member 131 and to the right front reinforcing member 132. At the front end of top panel 113 central inner reinforcing member 148 has top mounting part 149 spot welded thereto (see FIG. 9h).

A nut bracket 142 is spot-welded to both left side inner reinforcing member 140 and to right side inner reinforcing member 141. These nut brackets 142 consists of a sheet metal body and threatened nuts 142a welded to the bracket to which the connecting hinge bracket 102 is attached by screws 104. As can be seen from FIG. 9d, nut bracket 142 is welded to the right side of reinforcing member 140 so that any screw or bolt which engages nuts 142a to attach the associate hinge tends to pull nut 142a towards reinforcing member 140 and not to rip the nut off the bracket 142.

Furthermore brackets 143 are spot-welded to left side panel 111 and right side panel 112 onto which guide parts 160 are attached.

In the front area, left mounting parts 144, 145 and right mounting parts 146, 147 are spot-welded to the left side reinforcing member 140 and a right side reinforcing member 141 which, in combination with the top mounting part 149 of the central reinforcing member 148, and the horizontal support plate 133, serve to hold the seal 158 in position.

For clarity reasons, the welding procedure is explained step by step in FIGS. 8a-i, whereby each figure shows a perspective and a top view of the procedure step. Due to symmetrical design and welding concepts, Figures only show weld spots etc. where visible presuming that the symmetric area is treated accordingly.

FIG. 8a shows the inner reinforcing members namely rear reinforcing member 120, front reinforcing member 130 and central reinforcing member 148 which are each assembled by MAO welding (due to production reasons, spot welding may be more preferably) their constituent parts together. These parts are then inserted into a welding rig.

FIG. 8b shows the left mounting parts 144, 145, right mounting parts 146, 147 and brackets 143 which are inserted into the welding rig.

FIG. 8c shows the left side reinforcing member 140, right side reinforcing member 141 and nut bracket 142 which are inserted into the rig and the reinforcing member and brackets are then spot-welded together. For clarity reason, the components described before are shown in weaker lines to better emphasise adhesive application.

FIG. 8d shows the application of adhesive (later referred as bondlines) to the darker areas Z of the inner reinforcing structure. The adhesive application partly replaces welding, especially spot welds which would be viewable on the outer skin. Secondly, adhesive serves as contact protection to avoid painting failure or rattling. The bondlines harden during drying after the painting procedure. For clarity reason, the components described before are shown in weaker lines to better emphasise adhesive application.

FIG. 8e shows the insertion of the top panel 113 and the left front outer panel 114 and right front outer panel 115 into welding rig. These outer panels are then spot-welded to the inner reinforcing structure shown in FIG. 8d. For clarity reason, the components described before are shown in weaker lines to better emphasise spot welds.

FIG. 8f shows the left side panel 111 and a right side panel 112 which are then spot-welded to the inner reinforcing structure in areas which are not seen as the spot welds are subsequently covered by scalings 151 or 153 after complete assembly.

FIG. 8g shows the laser beam welding of the visible connections W, W' on the hood assembly. Due to the high radius of the lower portions of the left front panel 114 and the right front panel 115 the laser welding connection W between these parts is not continuous. The laser welding W' between left side panel 111/right side panel 112 and top panel 113 is end-to-end. For clarity reason, the components described before are shown in weaker lines to better emphasise laser beam welds.

FIGS. 9a and 9b show side and front view with section lines A-A and B-B inserted.

FIG. 9c shows section A-A. As the design is symmetrical, FIG. 9d with Detail X of section A-A refers to left side and right side is not described in detail. In FIGS. 9c and 9d the connection between rear left inner reinforcing part 121 and right rear inner reinforcing part 122 forming inner reinforcing member 120 is not shown due to a local recess.

Rear inner reinforcing member 120 via its left rear reinforcing member part 121, is welded to left side reinforcing member 140 by spot welds SW1, whereby in the upper area nut bracket 142 is welded together with left rear reinforcing member part reinforcing member 121 and left side reinforcing member 140 in one step (three parts with one spot weld).

In the next step, top panel 113 is attached by spot welds SW2. A recess 121a is provided in left rear reinforcing member part 121 to enable access with the spot weld gun from underneath. In addition, bondline BL1 between left rear reinforcing member 121 and top panel 113 and bondline BL2 between left side reinforcing member 140 and top panel 113 are provided to improve part connection and avoid contact and thereby rattling or painting failures.

In the next step, left side panel 111 is assembled which is welded in the bottom area by spot weld SW3 and at the top by laser weld seam line SM1 in the area which is viewable in operation.

This concept enables the use of simple spot welding for most of the welding connections as spot welds SW1, SW2 and SW3 are covered by other parts or not visible. Especially spot weld SW2 between the top panel 113 and reinforcing member 140 is covered by side panel 111. Spot weld SW3 is not viewable when assembled. So this concept offers a structure which is reinforced over the complete outer contour but which do not require expensive finishing of spot welds before painting.

Only one weld seam line SM1 made by laser welding with high optical requirements is thereby needed between top panel 113 and left side reinforcing member 140. This provides significant reductions in manufacturing costs.

Additionally, nut bracket 142 can be added without visible welding connection. Furthermore, left rear reinforcing member 121 and left side reinforcing member 140 are provided with cutouts 121b and 140a to attach clips or other components e.g. electrical harness without being viewable from the outside. Alternatively electrical harness can be installed in cavities between these components.

FIG. 9e shows a detail of the welding connection in the front area, due to the symmetry of this arrangement only the left side connection will be described. In a first step, horizontal support plate 133 is welded to the left front reinforcing member 131 by spot weld SW3. Afterwards, left front outer panel 114 is welded to left front reinforcing member 131 by spot welds SW4 at a horizontal plane which is not viewable in operation. As horizontal support plate 133 is covering the region where spot weld SW4 must be made, a cutout 133a is provided in plate 133 to enable access with the spot weld gun.

FIG. 9f shows a side and front view to show position of section lines C-C, D-D.

FIG. 9g show interrupted section C-C with details the connection between left side inner reinforcing member 140 and left side outside panel 111. Spot welds SW6 are provided in the top area which are later covered by seal 151 when assembling front grill 150. Similar, spot welds SW7 are provided in the mid area which are later covered by seal 153 when assembling side grill 152. Spot weld SW7 lies in an area which is not viewed in detail due to the angle of sight. Additionally, connection of the left mounting part 145 to the left side reinforcing member 140 is shown.

FIG. 9h shows an interrupted section D-D through the longitudinal axis of the vehicle and hood, especially the connection between top panel 113, rear reinforcing member 120 and central front reinforcing member 148. In the rear, the connection between left rear reinforcing member 121 and a right rear reinforcing member 122 is done by spot-welds SW9 between overlapping areas without any contact with the top panel. Additionally, sealing support 123 for taking seal 159 is spot welded accordingly.

Again, all spot welds are positioned in an area which is later covered by sealings/grills or not viewable.

FIG. 10a shows a side view and FIG. 10b a front view to indicate the position of the sections described below.

FIG. 10c shows section E-E of FIG. 10a describing the installation of components on top hood 100, especially the assembly of side grills 152.

The side grill 152 is made of perforated grill grid with ragged edges which may damage paint when contacting welded hood assembly 110. To avoid direct contact, a seal 153 is provided. The seal 153 (which is shown in FIG. 10d in its production stage without surrounding components) is substantially U-shaped in cross section when mounted in its operating position but is of asymmetrical shape prior to mounting to optimize assembly. A first limb 153a of the seal is longer than and extends beyond the second limb 153b. During assembly, this first limb 153a is brought in contact with the mating edge of components 11 and 140 and then deformed to extend the gap 153c between limbs 153a and 153b so that the second limb 153b can slide onto the mating component 111,140. In FIG. 10c the mating portion of the hood is the welded seam between left side reinforcing member 140 and side panel 111 so that both first limb 153*a* and second limb 153*b* of seal 153 hide spot weld SW5 between them. In addition, sharp edges are covered to avoid injury during assembly and to avoid e.g. water entering between mating components which may cause corrosion.

The opposing side of the seal has a slanted base portion with corner 153*d* above corner 153*e* to contact the inclined mating surface of the side grill 152 so that the clamping force/pressure applied to corners 153*d* and 153*e* is equalized although the mating surface on grill 152 is inclined relative to seal 153. The side grill 152 is attached to the hood welding assembly 110 by circumferential clips 170 which are fitted to left side reinforcing member 140.

Guide parts 160 are attached to the left side reinforcing member 140 and the bracket 143 to protect areas which may come into contact with moving parts. Sealing 158, which gets into contact with cooling package in operation is assembled to left mounting parts 144.

FIG. 10*e* shows the assembly and adjustment of the main lights 155 in section F-F of FIG. 10*b*. Light console 154 is mounted to the support plate 133 by screws, which are not shown. The main lights 155 are mounted on the light console 154 and extend through the welded hood assembly 110, respectively left front panel 114 and right front panel 115, and part 157. As the main lights 155 must be adjustable according legal requirements, adjustment screws 180 are provided which engage with the lights. By turning the screws 180, the inclination in vertical direction of the main light can be adjusted in well-known manner. The adjustment requires gaps between the light 155 and the surrounding peripheral elements of the light console 154 through which air and debris may pass without being filtered by front grill 150 or side grills 152. A flexible annular seal 181 (see FIG. 10*h*) made from rubber closes these gaps in operation but at the same time enables adjustment. The seal is therefore equipped with moveable flaps 181*a* which are normally in contact with its mating surface 115*a* of the right front panel 115. As best seen in FIG. 10*f*, these flaps 181*a* can be reached by disassembling cover part 157. Each flap 181*a* is provided with a handle portion 181*b* which can then be bended away from mating surface and a screw driver 182 can be inserted to reach adjustment screw 180.

FIG. 10*g* shows detail of FIG. 6*a* on the right side with lining part 157 not shown. FIG. 10*h* shows seal 181 in different views.

Left side panels 200 and right side panel 300 cover the side of engine bay underneath top hood section 100 and must be removed for many purposes, e.g. maintenance reasons. As both panels are very similar only the right side panel 300 is described in detail below.

FIG. 11*a* and FIG. 11*b* shows side panel 300 with FIG. 11*b* showing an exploded view. The side panel 300 consists of an upper welded panel assembly 310 and a lower outer panel 320 is made of plastics and painted in a different colour compared to welded panel assembly 310 to which it is attached. Three grill parts 330*a*, 330*b*, 330*c*, also made of plastics, are also attached to the assembly 310. In the bottom area, a front connecting means 340 which is H-shaped is attached by screws 341 to the side panel and engages with a mating front support 50 (see FIG. 15*e*) attached to the chassis. A rear connecting means 342 which is attached by screws 343 to the side panel 300 engages a rear support (see FIG. 15*c*) attached to the chassis as explained below. A latch 350 which is mounted in the top mid area of the side panel 300 is closed by movement of a lever of the latch.

Similar guide parts 160 are also shaped-in to welded panel assembly 310. These guide parts 160 are positioned so that they contact with the respective guide parts 160 which are assembled on top hood 100 as best seen in FIGS. 12*a* and 12*b* whereby these guide parts 160 are positioned in an area which is mainly covered by top hood 100. Thereby painting is protected without impacting on the styling of the hood.

FIG. 13 shows welded panel assembly 310 which is again of a double skin construction having an outer panel 311, an inner reinforcing member 312 and an exhaust cover 313 and two nut brackets 315 which are spot welded to the inner reinforcing member 312. Nut bracket 315 consists of a sheet metal body and threatened welding nuts to which front connecting means 340 and rear connecting means 342 are attached by respective screws 341, 343 (see FIG. 11*a/b*). Outer panel 311 and an inner reinforcing member 312 are connected by spot welding around outer contour of outer panel 311, whereby all spot welds lying in the plane of projection in FIG. 13*a* are cover later on by overlapping parts of top hood 100 or lower lining panel 320. The spot welds in the rear transverse plane an in the area below exhaust cover 313 are hardly visible when standing beside the tractor. FIG. 13*c* shows section G-G of FIG. 13*a* with the connection between outer panel 311, inner reinforcing member 312 and exhaust cover 313. To avoid visible spot welds, exhaust cover 313 is connected to inner reinforcing member 312 by spot welds SW30 which are later covered by outer panel 311 which is welded to the inner reinforcing member 312 at the rear area by spot welds SW31. In the illustrated embodiment, outer panel 311 is provided with a corrugation 311*a* in the area where exhaust cover 313 is attached in cut-out 311*b*. This cut-out 311*b* and exhaust cover 313 may be left out of the side panel 300 where no exhaust components are close to the side panel so that the side panel may be similar to the side panel 200 on the left side.

The manufacturing concept described above has the advantage that no complex laser or other welding with high optical requirement and high manufacturing efforts is needed for side panels 200/300 while a structure is provided which is reinforced over the complete outer contour.

FIG. 14*a* shows the assembly of lower lining panel 320 and three grill parts 330*a*, 330*b*, 330*c*, all made of plastic in different colour compared to the painted welded panel assembly 310.

FIGS. 14*b* to 14*d* show assembly of three grill parts 330*a*, 330*b*, 330*e*. Due to similar approach, procedure referring to grill part 330*a* only is explained in detail.

During assembly, grill part 330*a* is in the first step connected with welded panel assembly 310 in the rear area by engaging two respective hooks 330*d* into cut-outs 311*c* in outer panel 311, the cut-outs 311*c* being covered by grill part 330*a* after assembly as described in FIG. 14*d*. In a second step, grill part 330*a* is fixed in the front area with two respective screws 331 screwed into first cylindrical bases 330*e* formed integrally with grill part 330*a* and a bore 311*d* in outer panel 311 as described in FIG. 14*c*. These two fixings keep grill part 330*a* in position but in-between, to avoid rattling, a third connection as described in FIG. 14*c* is provided which is realized by four combinations of a lock washer 332 and an o-ring 333 which are pushed on a second cylindrical boss 330*f* whereby the teeth of lock washer 332 engage with second cylindrical boss 330*f* extending through cut-outs 312*a* of inner reinforcing member 312 and thereby keep in position. O-ring 333 is provided to avoid rattling but may be excluded when requirements are low.

FIGS. 14*e* and 14*f* show the assembly of lower outer panel 320. During assembly, lower outer panel 320 is in the first step connected with welded panel assembly 310 in its upper area by engaging respective hooks 320*a* which enter cut-outs 311*e* in outer panel 311, the cut-outs 311e being covered by lower lining panel 320 after assembly. In a second step, lower lining panel 320 is fixed with nine respective screws 321 screwed into first cylindrical bosses 320b integrally formed in the lower lining panel 320 and a bore 312b in inner reinforcing member 312.

FIGS. 15a to 15g show the assembly of side panels 200/300 to the tractor, respective to the top hood 100. As best seen in FIG. 11b, the rear connecting means 342, is attached by screws 343 to welded panel assembly 310. As best seen in right view in FIG. 15c and the related top view section L-L in FIG. 15d the rear connecting means 342 has a V-shaped cut-out 342a which engages in a tapering slot 40b (see FIG. 15e) in rear support 40. To ease assembly, a transverse shoulder 40a is provided which is contacted by connecting means 342 helps to centre the rear connecting means 342.

Figure 15F:
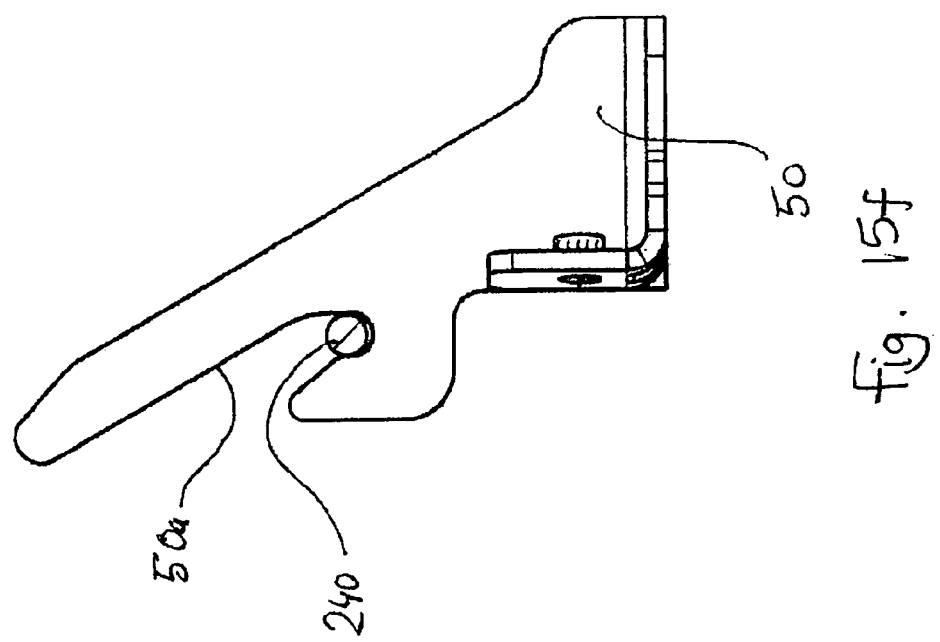

FIG. 15f shows the H-shaped front connecting means 340 attached by screws 343 to welded panel assembly 310 as shown in FIG. 11b which engages into a cut-out 50a in front support 50.

FIG. 15g shows Section M-M of FIG. 15a. Top side panel latch 350 is fitted to the side panel 200/300 by placing the latch in a respective cut-out in the outer skin/outer panel 311. Then, a fixing clamp 350a is moved toward the inner reinforcement member 312 by adjusting screw 350b. The latch 350 has a bent lever 350c which on one end has an adjusting means which contains a threatened bolt 350d with a rubber head 350e fixed by nut 350f to adjust the distance from the lever 350c to a mating surface 60a on a top fastening bracket 60 supported from the chassis. On the other end of the lever 350c, a notch 350g is provided. Lever 350c is kept in the closed position shown in FIG. 15h by a locking button 350h which engages with notch 350g. If button 350h is pressed, notch 350g is disengaged and lever 350c pivots (forced by not shown torsion spring) to the position shown in FIG. 15i. The side panels can then be disassembled. The latch is closed by pushing the end of lever 350c with the notch 350g towards button 350h until notch 350g engages button 350h.

Due to the double layer concept, any deformation caused by the clamping of latch 350 is not visible as the latch is mounted on the inner reinforcing member. Also, as can be seen from FIG. 15g, the latch 350 is covered by top hood 100 when the side panel is in its operating position to avoid dust and debris impact and to improve styling of the hood by a smooth appearance.

This side panel fastening arrangement is an improvement on known side panel constructions where the locking mechanism is placed behind and covered by the side panel thus requiring the operator to put his hand behind the hot side panel to operate the locking mechanism which is also not visible. With the present design the side panel can be released by the operator operating a lever mounted on the outer side of the side panel.

In addition, two adjustment means 70 are provided to adjust the position of each side panel position. As described in FIG. 15j (for section N-N shown in FIG. 15a) and FIG. 15k (for section O-O shown in FIG. 15a) the adjustment means 70 consists of a screw 70a and a nut 70b defining distance and a rubber part 70c for avoiding rattling which makes contact with inner reinforcing member 312.

The present invention thus provides an engine hood arrangement for a tractor which can be constructed from largely metal components and still achieve the necessary stiffness to resist twisting when in use and has a good quality appearance as all the joints between the various metal components of the hood are concealed when the hood is in its operating position. A good quality paint finish can therefore be provided without the need to use plastics materials thus avoiding expensive part costs which are difficult to justify on higher production volume vehicles.

In the above described embodiment, laser welding is described in a sense that both edges are melded to each other and thereby the two components are connected without any additional material being added. Alternatively, other welding procedures for high quality welding on viewable edges like laser brazing or laser with additional material may be used. In addition, other welding procedure like MAG welding providing high quality viewable welding beads may be used.

The invention claimed is:

1. An engine hood for a tractor or similar vehicle, the hood being of generally inverted U-shaped configuration with an upper top portion and downwardly extending side portions, the hood being hinged adjacent one end for upward pivoting between a closed position in which an associated engine is covered and an open position which provides access to the engine, the hood having an outer metal skin and inner metal skin reinforcing members permanently secured to the inside of the outer skin so that the outer metal skin and the inner metal skin reinforcing members form two longitudinally extending hollow beam-like structures which extend away from a hinge at one end of the hood towards an opposite other end of the hood to stiffen the hood against twisting.

2. A hood according to claim 1 provided with inner reinforcing members which extend between the beam-like structures to further stiffen the hood.

3. A hood according to claim 2 in which the hinge is mounted on the hood via one of said inner reinforcing members which extends between the beam-like structures adjacent said one end of the hood.

4. A hood according to claim 2 in which the outer skin at the other end of the hood houses lighting units and has at least one of said inner reinforcing members extending between the beam-like structures which also supports the lighting units.

5. A hood according to claim 4 in which the lighting units are mounted in apertures in the inner reinforcing member at the other end of the hood and a gap between each light and its associated aperture is sealed by a flexible generally annular sealing member which surrounds the light and contacts the light and reinforcing member.

6. A hood according to claim 5 in which each annular sealing member includes one or more moveable flaps each of which when moved to an open position provides access to a light adjustment screw.

7. A hood according to claim 2 in which nut brackets for the attachment of hood hinges are secured to the inner reinforcing members of the beam-like structures.

8. A hood according to claim 2 which the outer skin is welded to the inner reinforcing members around the edges of air cooling apertures in which grills and/or seals are subsequently mounted which hide the welds.

9. A hood according to claim 1 in which the hood has deeper side portions at the other end of the hood and the beam-like structures are also of a corresponding greater depth at said other end of the hood.

10. A hood according to claim 9 in which the greater depth portions of the beam-like structures each include a cooling aperture for the passage therethrough of cooling air.

11. A hood according to claim 10 in which grills are secured in position in the aperture or apertures, these grills being supported from the inner reinforcing members.

12. A hood according to claim 11 in which seals surround the apertures and are located between the grills and the reinforcing members.

13. A hood according to claim 12 in which the seals are of substantially U-shaped cross-section with one limb of the U being longer than the other to allow easy engagement around an edge of the apertures.

14. A hood according to claim 13 in which a base portion of the U-shaped cross-section seal is slanted to apply equalised pressure to an inclined mating surface.

15. A hood according to claim 1 in which the other end of the hood includes a large aperture between the beam-like structures for the passage therethrough of cooling air.

16. A hood according to claim 1 in which an inside of the hood carries one or more seals which make sealing contact with components under the hood to ensure the correct flow of cooling air when the hood is in the closed position.

17. A hood according to claim 1 in which the outer skin is secured to the inner reinforcing members at locations not visible in the finished hood.

18. A hood according to claim 1 in which a top outer skin panel extends between the beam-like structures and is secured along its longitudinal edges to the inner reinforcing members of the beam-like structures at locations not visible in the finished hood.

19. A hood according to claim 18 in which the longitudinal edges of the top outer skin panel are laser welded to the outer skin of the two beam-like structures.

20. A hood according to claim 1 in which apertures are provided in the inner reinforcing members to allow access to areas where the outer skin is welded to the inner reinforcing members.

21. A hood according to claim 1 in which the hood is hinged from an adjacent vehicle chassis via a pair of hinges each having a mounting plate having a pair of downwardly open bolt-receiving slots and a bolt receiving hole, the hood being lowerable to engage the bolt receiving slots with their respective bolts and then being securable in position by the insertion of a bolt through the bolt receiving hole and the tightening of the bolts.

22. A hood according to claim 1 in which separate readily demountable side panels are provided to mate with the shallower depth side portions of the top portion of the hood adjacent the hinge to complete the hood.

23. A hood according to claim 22 in which adjacent edges of the shallower depth side portions and the side panels are provided with co-operating guide blocks to protect the paint finish and reduce wear as the side panels are attached and detached, the guide blocks being largely concealed when the side panels are mounted in their operating positions.

24. A hood according to claim 22 in which each side panel is held in its operating position by front and rear fasteners adjacent its lower edge and a central fastener adjacent its upper edge.

25. A hood according to claim 24 in which at least one lower side panel fastener comprises a downwardly pointing V-shaped member carried by the side panel which engages with a support member mounted on the chassis which extends perpendicularly to the plane of the V-shaped member.

26. A hood according to claim 25 in which the support member cooperates with the V-shaped member to correctly locate the side panel transversely relative to the chassis.

27. A hood according to claim 25 in which the support member contacts the V-shaped member to position the side panel in the fore and aft direction relative to the chassis.

28. A hood according to claims 24 in which the upper central fastener can be operated from the outer side of the side panel and comprises a pivoting lever which engages behind a fastening bracket supported from the chassis.

29. A hood according to claim 28 in which the lever has a locking formation engageable with a locking button to hold the lever in a locked closed position, pressing of the button releasing the lever to release the fastener.

30. A hood according to claim 24 in which at least on lower side panel fastener comprises a generally longitudinally extending bar which is received in a cut out formed in a front support member mounted on the chassis.

31. A hood according to claim 22 in which each side panel has an outer skin with inner reinforcing members which stiffen the side panel.

32. A hood according to claim 31 in which each side panel includes one or more air cooling apertures in which a grill or grating is at least partly supported from one of the inner reinforcing members.

33. A hood according to claim 32 in which the grill is positioned locally by hook and screw connection to the outer skin and afterwards mated to the surface by a connection with the reinforcing member.

34. A hood according to claim 32 in which the side panel extension includes one or more air cooling apertures.

35. A hood according to claim 34 in which the side panel extension is fixed to the inner reinforcing member by a hook and screw connection.

36. A hood according to claim 22 in which an inner reinforcing member of each side panel extends beyond an edge of the side panel to support a side panel extension.

37. A hood according to claim 36 in which the side panel extension is made from plastics material and extends over the extension of the reinforcing member.

38. A hood according to claim 22 in which one of the side panels has a raised area which covers an exhaust pipe, the inner reinforcing member of the side panel having a cut out to accommodate the exhaust pipe, a separate raised outer skin panel being secured to the inner reinforcing member over the cut out, and the outer skin of the side panel overlapping the edges of the separate raised outer skin panel to conceal the welding of the separate panel to the inner reinforcing member.

39. A method of constructing an engine hood of generally inverted U-shaped configuration with a top portion and generally downwardly extending side portions for a tractor or similar vehicle, the method comprising:
   placing transversely extending metal inner skin reinforcing members in a welding jig;
   placing two longitudinally extending metal inner reinforcing members in the jig and welding the transversely extending reinforcing members therebetween;
   welding a top outer metal skin panel between the longitudinally extending metal inner reinforcing members, and
   welding longitudinally extending outer metal skin panels to the longitudinally extending metal inner skin reinforcing members at locations where the welds will not show in the complete hood to form with the longitudinally extending metal inner skin reinforcing members two longitudinally extending hollow beam-like structures which stiffen the hood against twisting.

40. A method according to claim 39 in which the top outer skin panel has its longitudinally extending edges laser welded to the longitudinally extending edges of the outer skin panels of the beam-like structures.

41. A method according to claim 39 in which, prior to welding the top outer skin panel in position, sealing/damping material is deposited on contacting areas of the longitudinally and transversely extending inner reinforcing members.

* * * * *